(12) United States Patent
Willard

(10) Patent No.: US 6,659,534 B2
(45) Date of Patent: Dec. 9, 2003

(54) HARD-TOP CONVERTIBLE ROOF SYSTEM

(75) Inventor: Michael T. Willard, Harrison Township, Macomb County, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 09/930,739

(22) Filed: Aug. 15, 2001

(65) Prior Publication Data

US 2003/0034667 A1 Feb. 20, 2003

(51) Int. Cl.$^7$ .................................................. B60J 7/08
(52) U.S. Cl. ............. 296/108; 296/107.08; 296/107.11; 296/107.17; 296/136
(58) Field of Search ................................. 296/108, 109, 296/117, 107.07, 107.11, 107.15, 107.16, 107.17, 136, 107.08, 76

(56) References Cited

U.S. PATENT DOCUMENTS

| | | |
|---|---|---|
| 404,405 A | 6/1889 | Haughey |
| 1,184,734 A | 5/1916 | Freeman |
| 1,784,279 A | 12/1930 | Ellerbeck |
| 1,988,346 A | 1/1935 | Wagner |
| 2,007,873 A | 7/1935 | Paulin |
| 2,076,243 A | 4/1937 | Marshall et al. |
| 2,564,446 A | 8/1951 | Parsons |
| 2,580,486 A | 1/1952 | Vigmostad |
| 2,596,355 A | 5/1952 | Ackermans |
| 2,704,225 A | 3/1955 | Anschuetz et al. |
| 2,747,928 A | 5/1956 | Olivier et al. |
| 2,768,024 A | 10/1956 | Spear, Jr. |
| 2,768,025 A | 10/1956 | Spear, Jr. et al. |
| 2,841,441 A | 7/1958 | Evans |
| 2,856,231 A | 10/1958 | Zeman |
| 2,869,923 A | 1/1959 | Mulichak |

(List continued on next page.)

FOREIGN PATENT DOCUMENTS

| | | |
|---|---|---|
| BE | 493260 | 5/1950 |
| CH | 650980 A5 | 8/1985 |
| DE | 646381 | 5/1937 |
| DE | 1 505 474 | 7/1969 |
| DE | 3416286 A1 | 10/1984 |
| DE | 3635373 A1 | 4/1988 |
| DE | 3635887 A1 | 5/1988 |
| DE | 3733892 A1 | 4/1989 |
| DE | 3816060 A | 11/1989 |
| DE | 9108242 | 12/1992 |

(List continued on next page.)

OTHER PUBLICATIONS

Picture of a 1957 Ford Fairlane retractable hardtop convertible, The Detroit News, Apr. 6, 1994.
Viper Pure Performance by Dodge/Auto Editors of Consumer Guide, Publications International, Ltd., pp. 6 and 7, 1993.
Automotive Industries, Feb. 1990, p. 75, showing "C & C Intrigue".
Automobil Revue, Sep. 5, 1991, cover page and p. 29 (including English translation).
Car Styling 86, Jan. 1992, cover page and pp. 64–67 (including English translation).

(List continued on next page.)

*Primary Examiner*—D. Glenn Dayoan
*Assistant Examiner*—Patricia Engle
(74) *Attorney, Agent, or Firm*—Harness, Dickey & Pierce, P.L.C.

(57) ABSTRACT

A convertible roof system includes a front roof section, a rear roof section, an automatically power actuator and a linkage mechanism. In another aspect of the present invention, the front and/or rear roof sections are rigid, hard-top roofs. A further aspect of the present invention provides that the outside surfaces of the roofs have a generally vertical orientation when in their open and retracted positions.

42 Claims, 18 Drawing Sheets

U.S. PATENT DOCUMENTS

| | | | |
|---|---|---|---|
| 2,919,156 A | 12/1959 | Dodge | |
| 2,939,742 A | 6/1960 | Dardarian et al. | |
| 2,997,337 A | 8/1961 | Day et al. | |
| 3,059,962 A | 10/1962 | Harms et al. | |
| 3,357,738 A | 12/1967 | Bourlier | |
| 3,375,037 A | 3/1968 | Hunt, Jr. | |
| 3,377,099 A | 4/1968 | Podolan | |
| 3,575,464 A | 4/1971 | Himka et al. | |
| 3,994,524 A | 11/1976 | Lehmann | |
| 4,168,859 A | 9/1979 | Breitschwerdt et al. | |
| 4,634,171 A | 1/1987 | McKeag | |
| 4,712,828 A | 12/1987 | Albrecht | |
| 4,729,592 A | 3/1988 | Tuchiya et al. | |
| 4,746,163 A | 5/1988 | Muscat | |
| 4,854,634 A | 8/1989 | Shiraishi et al. | |
| 4,895,409 A | 1/1990 | Konishi et al. | |
| 4,950,022 A | 8/1990 | Pattee | |
| 5,033,789 A | 7/1991 | Hayashi et al. | |
| 5,056,857 A | 10/1991 | Ney et al. | |
| 5,067,768 A | 11/1991 | Fischbach | |
| 5,078,447 A | 1/1992 | Klein et al. | |
| 5,090,764 A | 2/1992 | Kogawa et al. | |
| 5,161,852 A | 11/1992 | Alexander et al. | |
| 5,195,798 A | 3/1993 | Klein et al. | |
| 5,207,474 A | 5/1993 | Licher et al. | |
| 5,225,747 A | 7/1993 | Helms et al. | |
| 5,429,409 A | 7/1995 | Corder et al. | |
| 5,490,709 A | 2/1996 | Rahn | |
| 5,520,432 A | 5/1996 | Gmeiner et al. | |
| 5,533,777 A | 7/1996 | Kleemann et al. | |
| 5,542,735 A | 8/1996 | Furst et al. | |
| 5,593,202 A | 1/1997 | Corder et al. | |
| 5,743,587 A | 4/1998 | Alexander et al. | |
| 5,769,483 A | 6/1998 | Danzl et al. | |
| 5,785,375 A | 7/1998 | Alexander et al. | |
| 5,806,912 A | 9/1998 | Ramaciotti et al. | |
| D406,792 S | 3/1999 | Alexander et al. | |
| 5,979,970 A | 11/1999 | Rothe et al. | |
| 6,019,416 A | 2/2000 | Beierl | |
| 6,030,023 A | 2/2000 | Guillez | |
| 6,033,008 A | 3/2000 | Mattila | 296/107.17 |
| 6,033,009 A | 3/2000 | Ritter et al. | 296/121 |
| 6,033,012 A | 3/2000 | Russke et al. | |
| 6,053,560 A | 4/2000 | Rothe | 296/108 |
| D427,138 S | 6/2000 | Alexander et al. | |
| 6,168,224 B1 | 1/2001 | Henn et al. | 296/136 |
| 6,193,300 B1 * | 2/2001 | Nakatomi et al. | 296/107.08 |
| 6,217,104 B1 | 4/2001 | Neubrand | 296/108 |
| D442,541 S | 5/2001 | Alexander et al. | |
| 6,273,492 B1 | 8/2001 | Schroder et al. | 296/107.01 |
| 6,299,234 B1 | 10/2001 | Seel et al. | 296/108 |
| 6,312,041 B1 | 11/2001 | Queveau et al. | 296/107.17 |
| 6,312,042 B1 | 11/2001 | Halbweiss et al. | 296/108 |
| 6,315,349 B1 | 11/2001 | Kinnanen | 296/108 |
| 6,318,793 B1 | 11/2001 | Rapin et al. | |
| D452,675 S | 1/2002 | Alexander et al. | |
| 6,336,673 B1 * | 1/2002 | Rothe et al. | 296/107.17 |
| 6,347,828 B1 | 2/2002 | Rapin et al. | |
| 6,352,298 B1 * | 3/2002 | Hayashi et al. | 296/107.08 |
| 6,478,362 B2 * | 11/2002 | Obendiek | 296/107.08 |
| 6,497,447 B1 * | 12/2002 | Willard | 296/108 |
| 6,502,891 B2 | 1/2003 | Russke | 296/107.17 |
| 2001/0006297 A1 | 7/2001 | Dintner et al. | |
| 2001/0019213 A1 | 9/2001 | Eberle | |
| 2001/0020793 A1 | 9/2001 | Eberle | |
| 2001/0024050 A1 | 9/2001 | Schutt et al. | |
| 2002/0185886 A1 | 12/2002 | Obendiek | 296/108 |

FOREIGN PATENT DOCUMENTS

| | | | |
|---|---|---|---|
| DE | 4316485 A1 | 11/1994 | |
| DE | 43 20 603 A1 | 1/1995 | |
| DE | 43 24 708 A1 | 1/1995 | |
| DE | 44 38 191 C1 | 7/1995 | |
| DE | 44 38 190 C1 | 11/1995 | |
| DE | 44 31 656 C1 | 12/1995 | |
| DE | 4445580 C1 | 12/1995 | |
| DE | 4445941 C1 | 3/1996 | |
| DE | 4445944 C1 | 4/1996 | |
| DE | 4446483 A1 | 6/1996 | |
| DE | 195 17 063 C1 | 6/1996 | |
| DE | 44 45 920 A1 | 7/1996 | |
| DE | 195 14 022 C1 | 9/1996 | |
| DE | 19518071 A1 | 11/1996 | |
| DE | 19532568 C1 | 11/1996 | |
| DE | 19532567 C1 | 12/1996 | |
| EP | 0261379 A2 | 4/1987 | |
| EP | 0494366 A2 | 7/1992 | |
| FR | 1049026 | 12/1953 | |
| GB | 413467 | 7/1934 | |
| GB | 756531 | 9/1956 | |
| GB | 978638 | 12/1964 | |
| JP | 62-120222 | 6/1987 | |
| JP | 2-51925 | 4/1990 | |
| JP | 2-144226 | 4/1990 | |
| JP | 3-273977 A * | 12/1991 | 296/76 |

OTHER PUBLICATIONS

Introducing the Chevy SSR, Aug. 2000, 2 pgs. (and description of corresponding public use).

Alfa Romeo Proteo Or Alfa Romeo 164 Proteo/1991 (believed to have been offered for sale, publicly used, and/or published prior to the filing date of this application).

Alfa Romeo Spider Rht/2001.

Audi Quattro Roadster/1984–1987 (believed to have been offered for sale, publicly used, and/or published prior to the filing date of this application).

Bentley Retractable Hardtop/1999 (believed to have been offered for sale, publicly used, and/or published prior to the filing date of this application).

Bérard Roadster/2001.

BMW Klapp Top/2000 (believed to have been offered for sale, publicly used, and/or published prior to the filing date of this application).

Buick Blackhawk/2000 (believed to have been offered for sale, publicly used, and/or published prior to the filing date of this application).

Cadillac Allanté Charisma/1994 (believed to have been offered for sale, publicly used, and/or published prior to the filing date of this application).

Cadillac Evoq/1999 (believed to have been offered for sale, publicly used, and/or published prior to the filing date of this application).

C&C Intrigue/1990 (believed to have been offered for sale, publicly used, and/or published prior to the filing date of this application).

Chevrolet SSR/2000 (believed to have been offered for sale, publicly used, and/or published prior to the filing date of this application).

Chevrolet Corvette Retractable Hardtop/1958 (believed to have been offered for sale, publicly used, and/or published prior to the filing date of this application).

Chrysler Thunderbolt/1941 (believed to have been offered for sale, publicly used, and/or published prior to the filing date of this application).

Chrysler Dart/1957 (believed to have been offered for sale, publicly used, and/or published prior to the filing date of this application).
Chrysler Phaeton/1997 (believed to have been offered for sale, publicly used, and/or published prior to the filing date of this application).
Citroën 15 Six/1950 (believed to have been offered for sale, publicly used, and/or published prior to the filing date of this application).
Citroën 11 Légère/1952 (believed to have been offered for sale, publicly used, and/or published prior to the filing date of this application).
Daihatsu Kopen/1999 (believed to have been offered for sale, publicly used, and/or published prior to the filing date of this application).
Daihatsu Kopen/2001.
Edsel Retractable Hardtop/1958 (believed to have been offered for sale, publicly used, and/or published prior to the filing date of this application).
Edsel Skyliner/1958 (believed to have been offered for sale, publicly used, and/or published prior to the filing date of this application).
Ferrari Testarossa St. Tropez/1992 (believed to have been offered for sale, publicly used, and/or published prior to the filing date of this application).
Fiat Punto Wish/1999 (believed to have been offered for sale, publicly used, and/or published prior to the filing date of this application).
Ford Fairlane 500 Skyliner/1957 (believed to have been offered for sale, publicly used, and/or published prior to the filing date of this application).
Ford Fairlane 500 Skyliner/1958 (believed to have been offered for sale, publicly used, and/or published prior to the filing date of this application).
Ford Galaxie Skyliner/1959 (believed to have been offered for sale, publicly used, and/or published prior to the filing date of this application).
Ford Mustang Restro–mod/1964 (believed to have been offered for sale, publicly used, and/or published prior to the filing date of this application).
Ford Mustang Retractable Hardtop/1964 (believed to have been offered for sale, publicly used, and/or published prior to the filing date of this application).
Ford Mustang Retractable Hardtop/1966 (believed to have been offered for sale, publicly used, and/or published to the filing date of this application).
Ford Focus Cabriolet Retractable Hardtop/1999 (believed to have been offered for sale, publicly used, and/or published prior to the filing date of this application).
Gaylord Gladiator/1955–1956 (believed to have been offered for sale, publicly used, and/or published prior to the filing date of this application).
Heuliez Raffica/1992 (believed to have been offered for sale, publicly used, and/or published prior to the filing date of this application).
Heuliez Hardtop Intruder/1998 (believed to have been offered for sale, publicly used, and/or published prior to the filing date of this application).
Heuliez Retractop 2/2000 (believed to have been offered for sale, publicly used, and/or published prior to the filing date of this application).
Heuliez Retractop 10/2001.
Honda Argento Vivo/1995 (believed to have been offered for sale, publicly used, and/or published prior to the filing date of this application).
Hudson Super Six/1922 (believed to have been offered for sale, publicly used, and/or published prior to the filing date of this application).
Hudson Super Six/1923 (believed to have been offered for sale, publicly used, and/or published prior to the filing date of this application).
Isuzu VX–02/1999 (believed to have been offered for sale, publicly used, and/or published prior to the filing date of this application).
Karmann Coupé–Cabrio/ 1999 (believed to have been offered for sale, publicly used, and/or published prior to the filing date of this application).
Keinath GT/R/1996–200x (believed to have been offered for sale, publicly used, and/or published prior to the filing date of this application).
Lada Roadste/2000 (believed to have been offered for sale, publicly used, and/or published prior to the filing date of this application).
Lancia Belna Éclipse/1934 (believed to have been offered for sale, publicly used, and/or published prior to the filing date of this application).
Lexus Sport Coupé/ 1999 (believed to have been offered for sale, publicly used, and/or published prior to the filing date of this application).
Lexus SC430/2000–200x (believed to have been offered for sale, publicly used, and/or published prior to the filing date of this application).
Mercedes–Benz Magic Top/1984–1987 (believed to have been offered for sale, publicly used, and/or published prior to the filing date of this application).
Mercedes–Benz SLK Paris/1994 (believed to have been offered for sale, publicly used, and/or published prior to the filing date of this application).
Mercedes–Benz SLK/1996–200x (believed to have been offered for sale, publicly used, and/or published prior to the filing date of this application).
Mercedes–Benz GLK/1999 (believed to have been offered for sale, publicly used, and/or published prior to the filing date of this application.
Mercedes–Benz SL/2001–200x.
Michalak Corsaspider/1984–1988 (believed to have been offered for sale, publicly used, and/or published prior to the filing date of this application).
Peugeot 402 Éclipse Mécanique/1936–1938 (believed to have been offered for sale, publicly used, and/or published prior to the filing date of this application).
Peugeot 202 Éclipse/1938 (believed to have been offered for sale, publicly used, and/or published prior to the filing date of this application).
Peugeot 402b Éclipse Mécanique/1938–1939 (believed to have been offered for sale, publicly used, and/or published prior to the filing date of this application).
Peugeot 106 Spider/1992 (believed to have been offered for sale, publicly used, and/or published prior to the filing date of this application).
Peugeot 20♥/1998 (believed to have been offered for sale, publicly used, and/or published prior to the filing date of this application).
Peugeot Crisalys/1998 (believed to have been offered for sale, publicly used, and/or published prior to the filing date of this application).

Peugeot 607 Paladine/2000 (believed to have been offered for sale, publicly used, and/or published prior to the filing date of this application).

Peugeot 206 CC/2000–200x (believed to have been offered for sale, publicly used, and/or published prior to the filing date of this application).

Peugeot 206 CC Ciel Bleu/2001.

Playboy/1947–1951 (believed to have been offered for sale, publicly used, and/or published prior to the filing date of this application).

Scimitar Hard–Top Convertible/1959 (believed to have been offered for sale, publicly used, and/or published prior to the filing date of this application).

Skyline X–50/1953 (believed to have been offered for sale, publicly used, and/or published prior to the filing date of this application).

Suzuki C2/1997 (believed to have been offered for sale, publicly used, and/or published prior to the filing date of this application).

Toyota MRJ/1995 (believed to have been offered for sale, publicly used, and/or published prior to the filing date of this application).

Mitsubishi Colt Aiolia/1988 (believed to have been offered for sale, publicly used, and/or published prior to the filing date of this application).

Mitsubishi 3000 GT Spyder/1994–1996 (believed to have been offered for sale, publicly used, and/or published prior to the filing date of this application).

Mohs Safarikar/1972–1975 (believed to have been offered for sale, publicly used, and/or published prior to the filing date of this application).

Nissan Luc–2/1985 (believed to have been offered for sale, publicly used, and/or published prior to the filing date of this application).

Nissan 300 ZX/1992 (believed to have been offered for sale, publicly used, and/or published prior to the filing date of this application).

Nissan Silvia Varietta/1999 (believed to have been offered for sale, publicly used, and/or published prior to the filing date of this application).

Oldsmobile F–88 MK3/1959 (believed to have been offered for sale, publicly used, and/or published prior to the filing date of this application).

Paxton/1951 (believed to have been offered for sale, publicly used, and/or published prior to the filing date of this application).

Peugeot 301 Éclipse/1934 (believed to have been offered for sale, publicly used, and/or published prior to the filing date of this application).

Peugeot 601c Éclipse/1934 (believed to have been offered for sale, publicly used, and/or published prior to the filing date of this application).

Peugeot 601dl Éclipse/1934 (believed to have been offered for sale, publicly used, and/or published prior to the filing date of this application).

Peugeot 401d Éclipse/1934–1935 (believed to have been offered for sale, publicly used, and/or published prior to the filing date of this application).

Peugeot 601d Éclipse/1934–1935 (believed to have been offered for sale, publicly used, and/or published prior to the filing date of this application).

Peugeot 402 Éclipse Électrique/1935–1936 (believed to have been offered for sale, publicly used, and/or published prior to the filing date of this application).

Toyota Soarer/2000–200x (believed to have been offered for sale, publicly used, and/or published prior to the filing date of this application).

Treser T1/1987–198x (believed to have been offered for sale, publicly used, and/or published prior to the filing date of this application).

Valmet Boreal/1997 (believed to have been offered for sale, publicly used, and/or published prior to the filing date of this application).

Volvo C70 Hatric/2001 (believed to have been offered for sale, publicly used, and/or published prior to the filing date of this application).

Volvo Lowrider/19xx (believed to have been offered for sale, publicly used, and/or published prior to the filing date of this application).

* cited by examiner

HARD-TOP CONVERTIBLE ROOF SYSTEM

BACKGROUND AND SUMMARY OF THE INVENTION

This invention relates generally to automotive roof systems and more particularly to a convertible roof system for an automotive vehicle.

Rigid hard-top convertible roofs have been used on a variety of automotive vehicles. Some of these conventional convertible hard-top roofs are stored in a generally vertical orientation and some are stored in a predominantly horizontal orientation. Furthermore, some of these conventional hard-top roofs fold in a clamshelling manner while others are collapsible in an overlapping manner. Most convertible hard-top roofs, however, employ a complicated linkage arrangement to couple the forward most hard-top roof section to either the vehicle body or the rear hard-top roof section. This is often due to the weight and moment-arm effect of the front roof section during retraction. For example, many of these known mechanisms use an elongated balance link coupling the body to the front roof section, or an elongated sliding or track guide secured to the vehicle body and coupled to a link; notwithstanding, such mechanisms may pose packaging and assembly obstacles in the typically tight confines of the vehicle body. Additionally, many of these traditional roof sections are difficult to tightly nest together in a stowed position in order to minimize the convertible roof storage space in the vehicle.

Examples of traditional hard-top convertible roofs are disclosed in the following patents: U.S. Pat. No. 5,979,970 entitled "Roof Assembly for a Convertible Vehicle" which issued to Rothe et al. on Nov. 9, 1999; U.S. Pat. No. 5,785,375 entitled "Retractable Hard-Top for an Automotive Vehicle" which issued to Alexander et al. on Jul. 28, 1998; U.S. Pat. No. 5,769,483 entitled "Convertible Motor Vehicle Roof" which issued to Danzl et al. on Jun. 23, 1998; U.S. Pat. No. 5,743,587 entitled "Apparatus for Use in an Automotive Vehicle having a Convertible Roof System" which issued to Alexander et al. on Apr. 28, 1998; and EPO Patent Publication No. 1 092 580 A1 which was published on Apr. 18, 2001. The U.S. patents are incorporated by reference herein.

In accordance with the present invention, a convertible roof system includes a front roof section, a rear roof section, an automatically power actuator and a linkage mechanism. In another aspect of the present invention, the front and/or rear roof sections are rigid, hard-top roofs. A further aspect of the present invention provides that the outside surfaces of the roofs have a generally vertical orientation when in their open and retracted positions. In yet another aspect of the present invention, a linkage assembly having at least a four-bar linkage arrangement couples the front roof section to the rear roof section. The convertible roof system employs another linkage assembly having at least a four-bar linkage arrangement which couples the rear roof section to the vehicle body, in still another aspect of the present invention. A further aspect of the present invention provides that a single link adjacent to each outboard side of the front roof is the sole mechanism which couples together the hard-top front roof to the rear roof and the top stack mechanism. Another aspect of the present invention uses a rigid tonneau cover and tonneau cover linkage mechanism to cover a roof storage space which does not obstruct a trunk or bed area of the vehicle. In a further aspect of the present invention, a supplemental automatic actuator is operable to more closely store together the fully retracted front and rear roof sections.

The hard-top convertible roof system of the present invention is advantageous over conventional systems in that the present invention minimizes the stored roof packaging area by tightly collapsing one roof section relative to the other. The present invention convertible roof system is also advantageous by employing a relatively powerful and easy to package linkage mechanism that allows for collapsing of the relatively heavy hard-top roof sections with minimal, if any, intrusion on the passenger compartment area of the vehicle while also storing the roof forward of a user accessible storage area, such as a trunk or pickup truck bed. Furthermore, the present invention does not require as great a centerline opening for the roof storage area as do many traditional hard and soft-top convertible roofs. The convertible roof system of the present invention is also simpler and less costly to assemble to the vehicle body since fewer body attachment points are used. Additional advantages and features of the present invention will become apparent from the following description and appended claims, taken in conjunction with the accompanying drawings.

DETAILED DESCRIPTION OF THE PREFERRED EMBODIMENT

Figure 1:
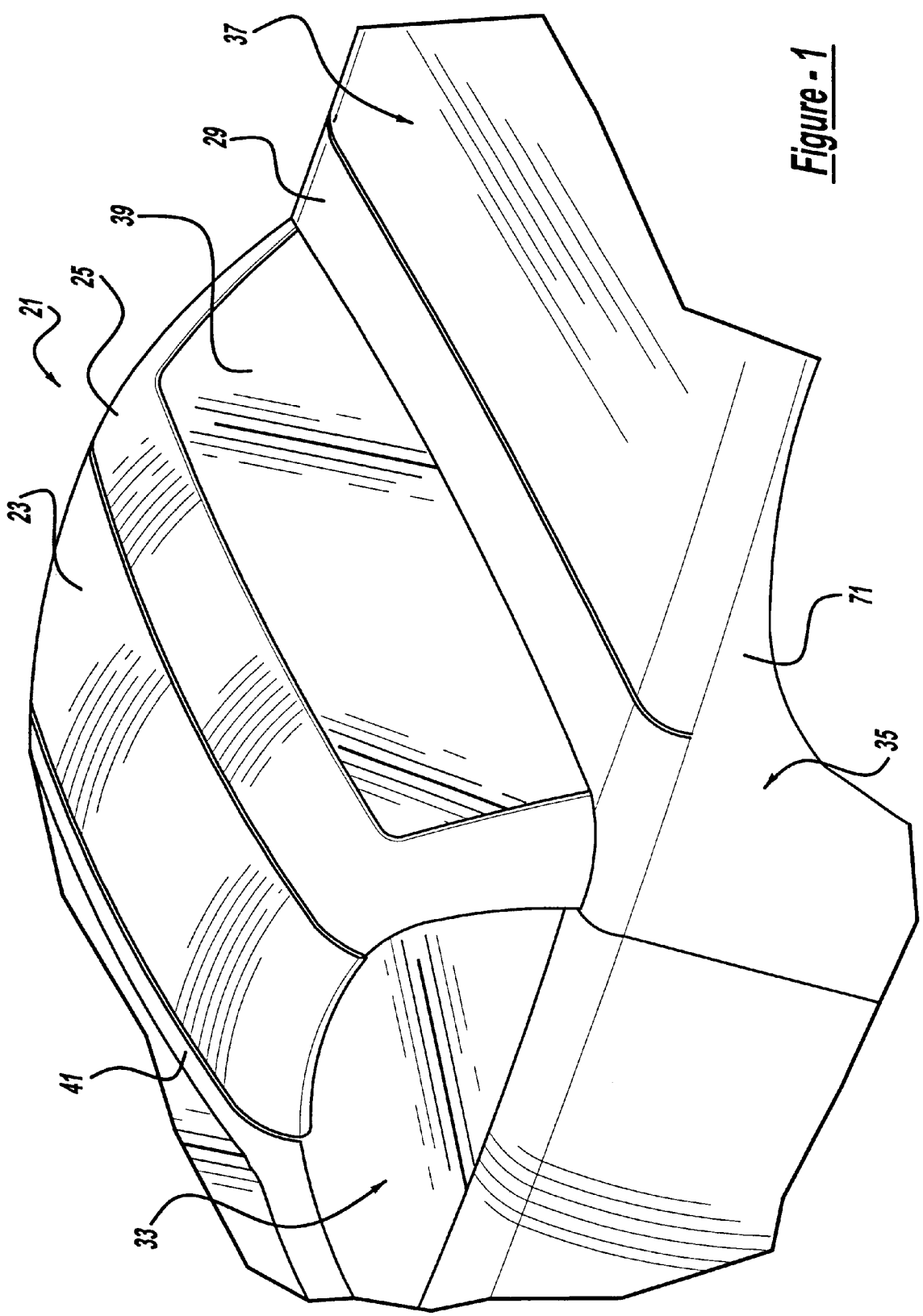
FIG. 1 is a fragmentary, perspective view, as observed from the rear left corner of the vehicle, showing the preferred embodiment of a hard-top convertible roof system of the present invention disposed in a fully closed and raised position.
Figure 2:
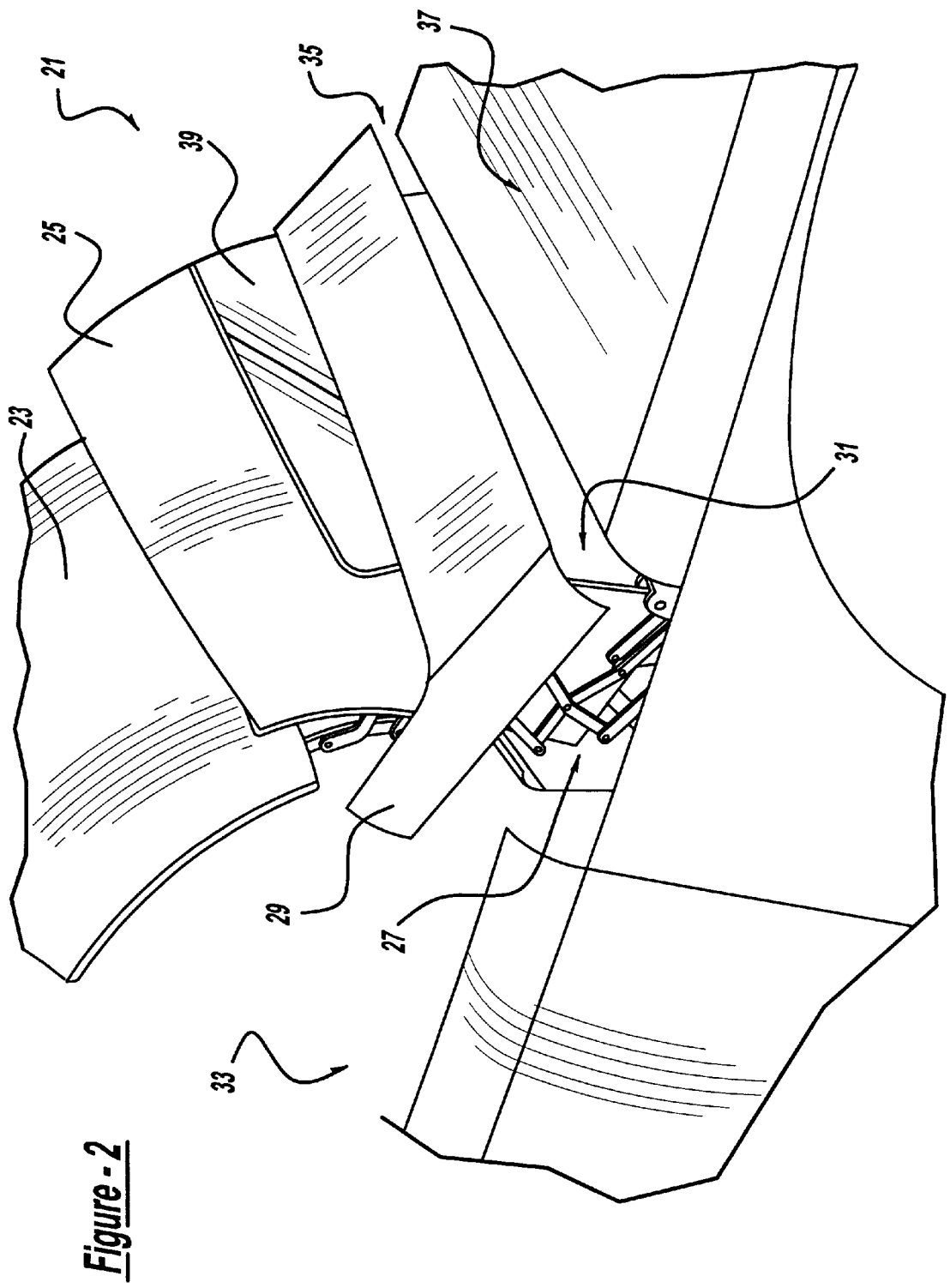
FIG. 2 is a fragmentary and perspective view, like that of FIG. 1, showing the preferred embodiment hard-top convertible roof system disposed in a partially retracted position.
Figure 3:
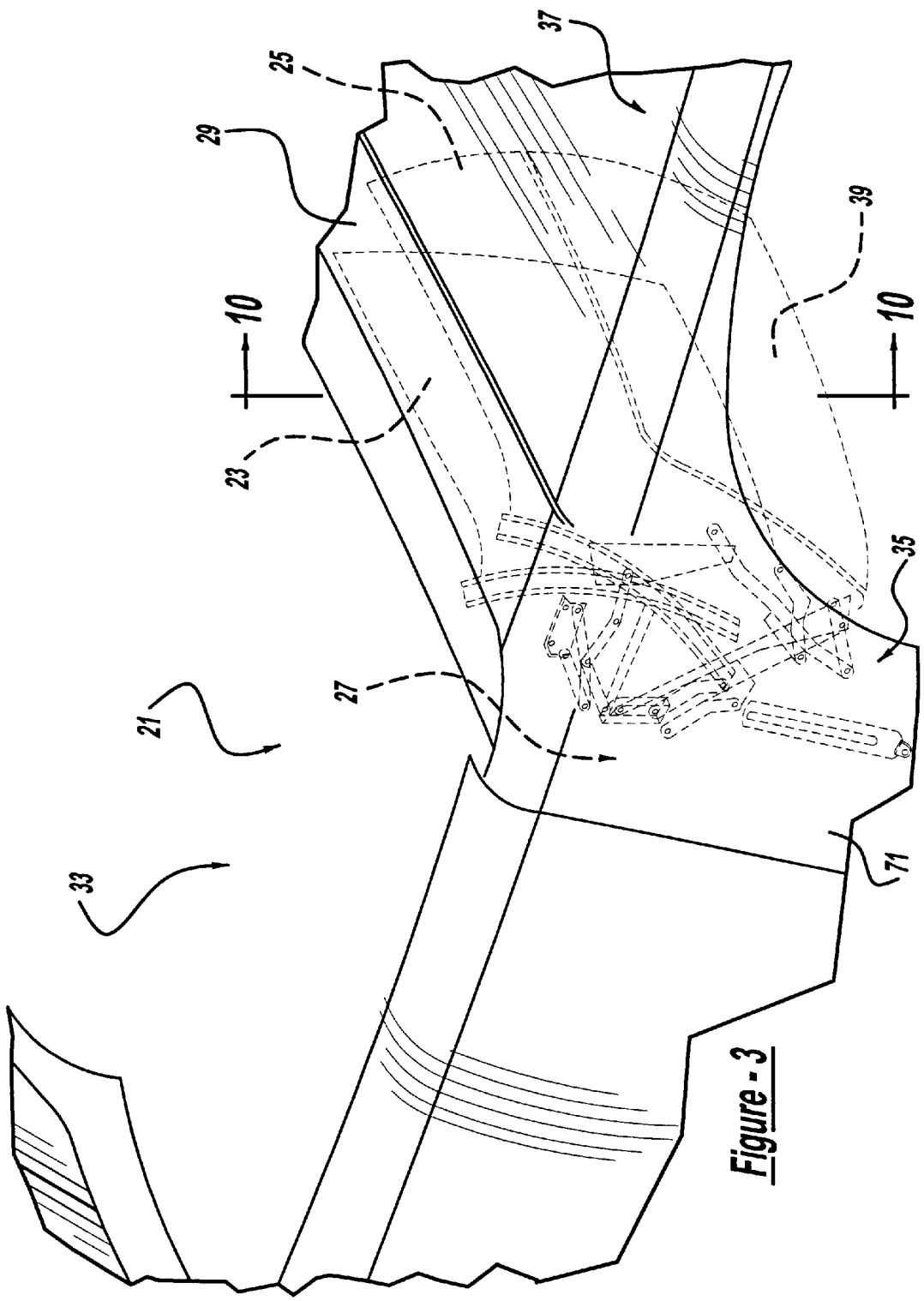
FIG. 3 is a fragmentary and perspective view, like that of FIG. 1, showing the preferred embodiment hard-top convertible roof system disposed in a fully open and retracted position.
Figure 4:
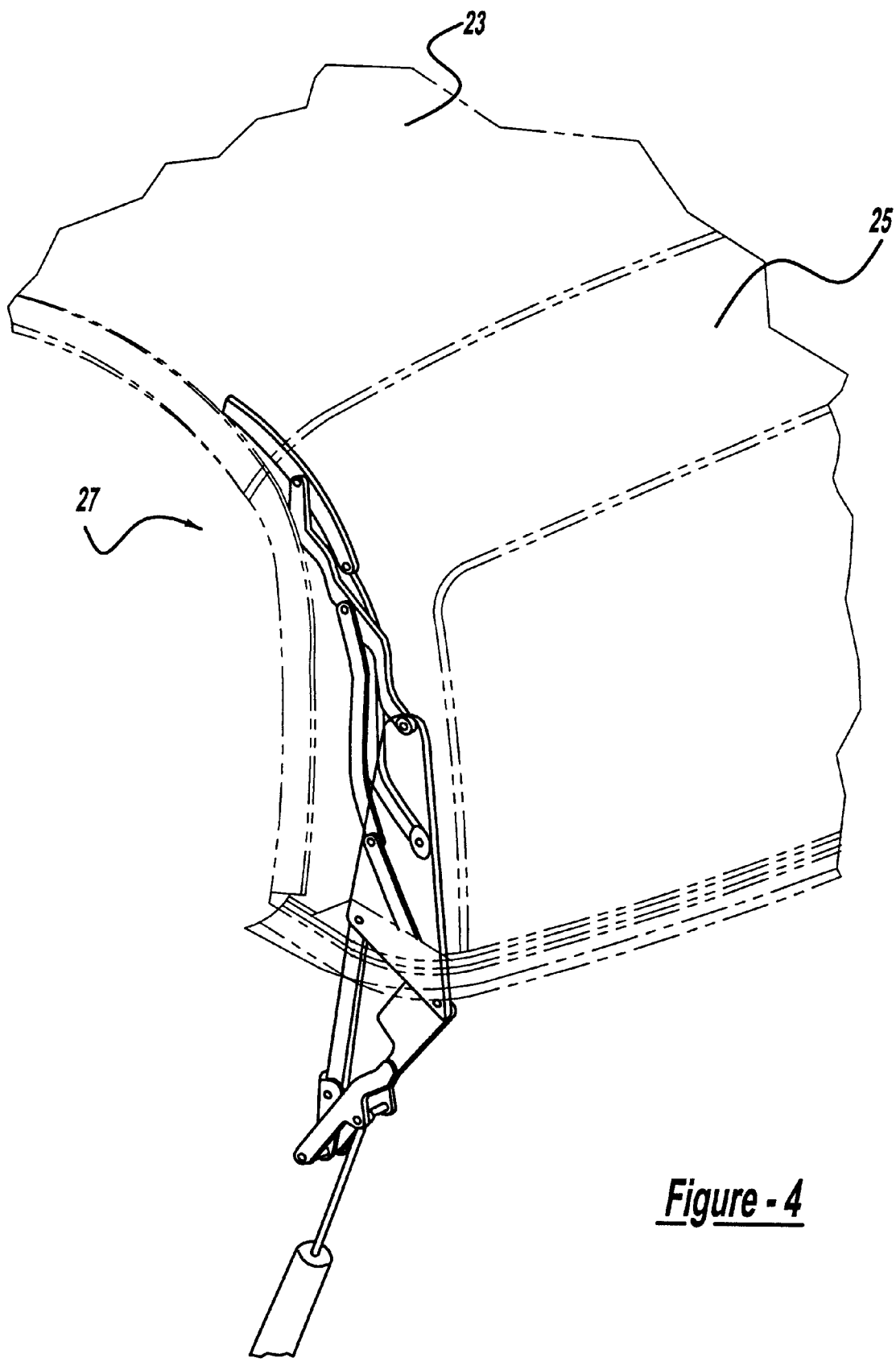
FIG. 4 is a perspective view, like that of FIG. 1, showing a top stack mechanism employed in the preferred embodiment hard-top convertible roof system, disposed in a fully raised position.
Figure 5:
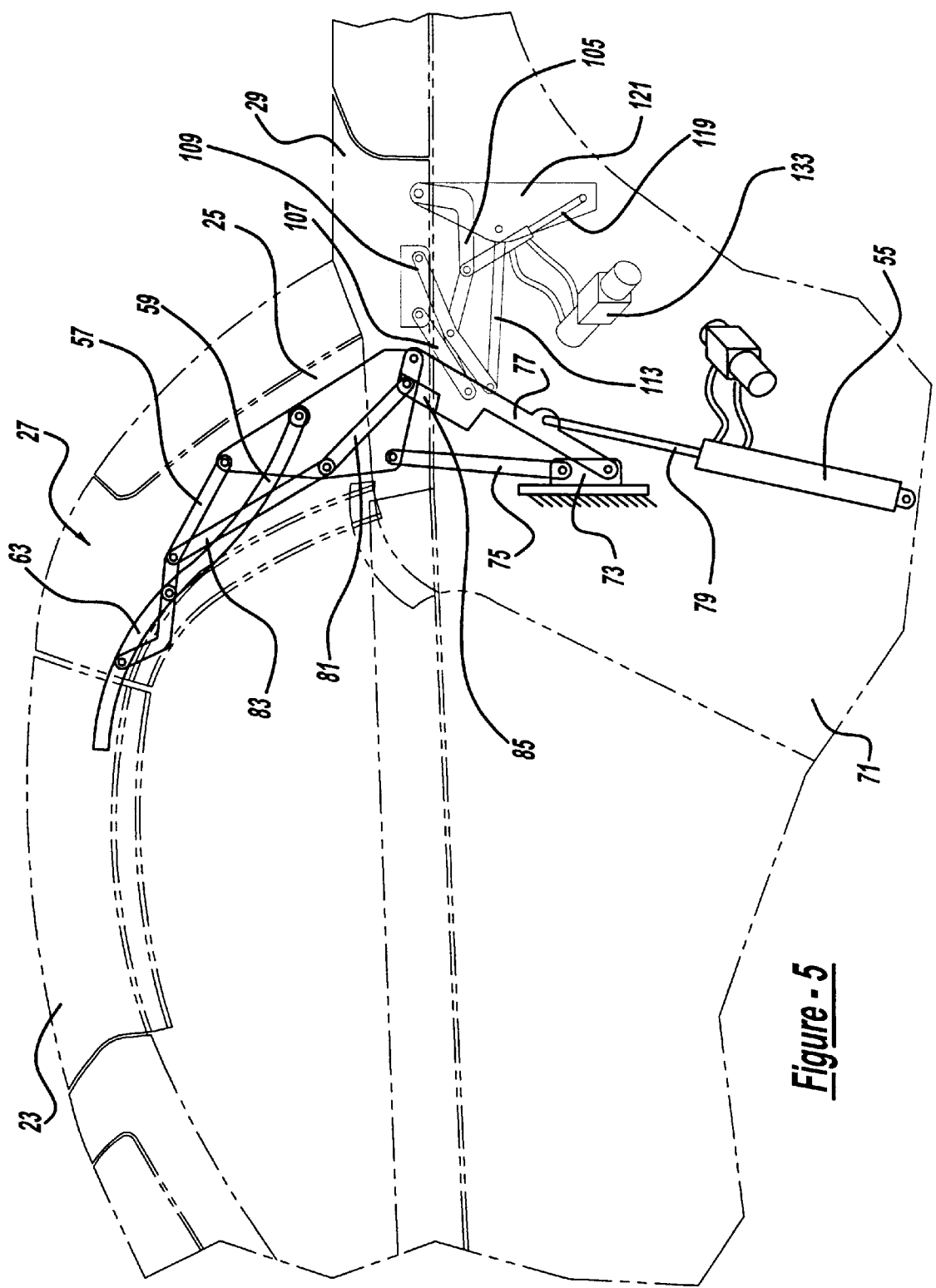
FIG. 5 is a side diagrammatic view showing the top stack mechanism and a tonneau cover mechanism employed in the preferred embodiment hard-top convertible roof system, disposed in the fully raised roof and closed tonneau cover positions.
Figure 6:
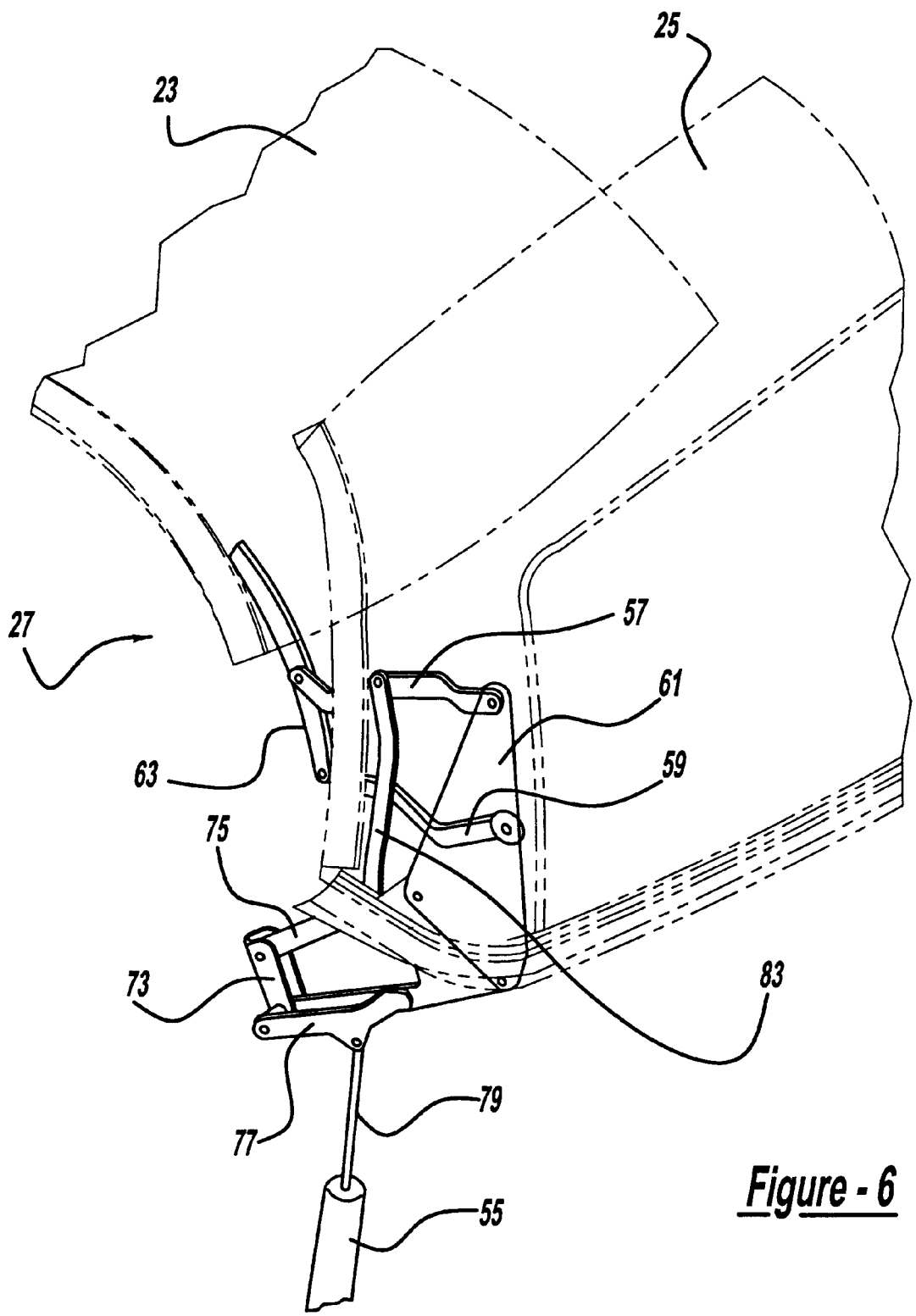
FIG. 6 is a perspective view, like that of FIG. 1, showing the top stack mechanism employed in the preferred embodiment hard-top convertible roof system, disposed in a partially retracted position.
Figure 7:
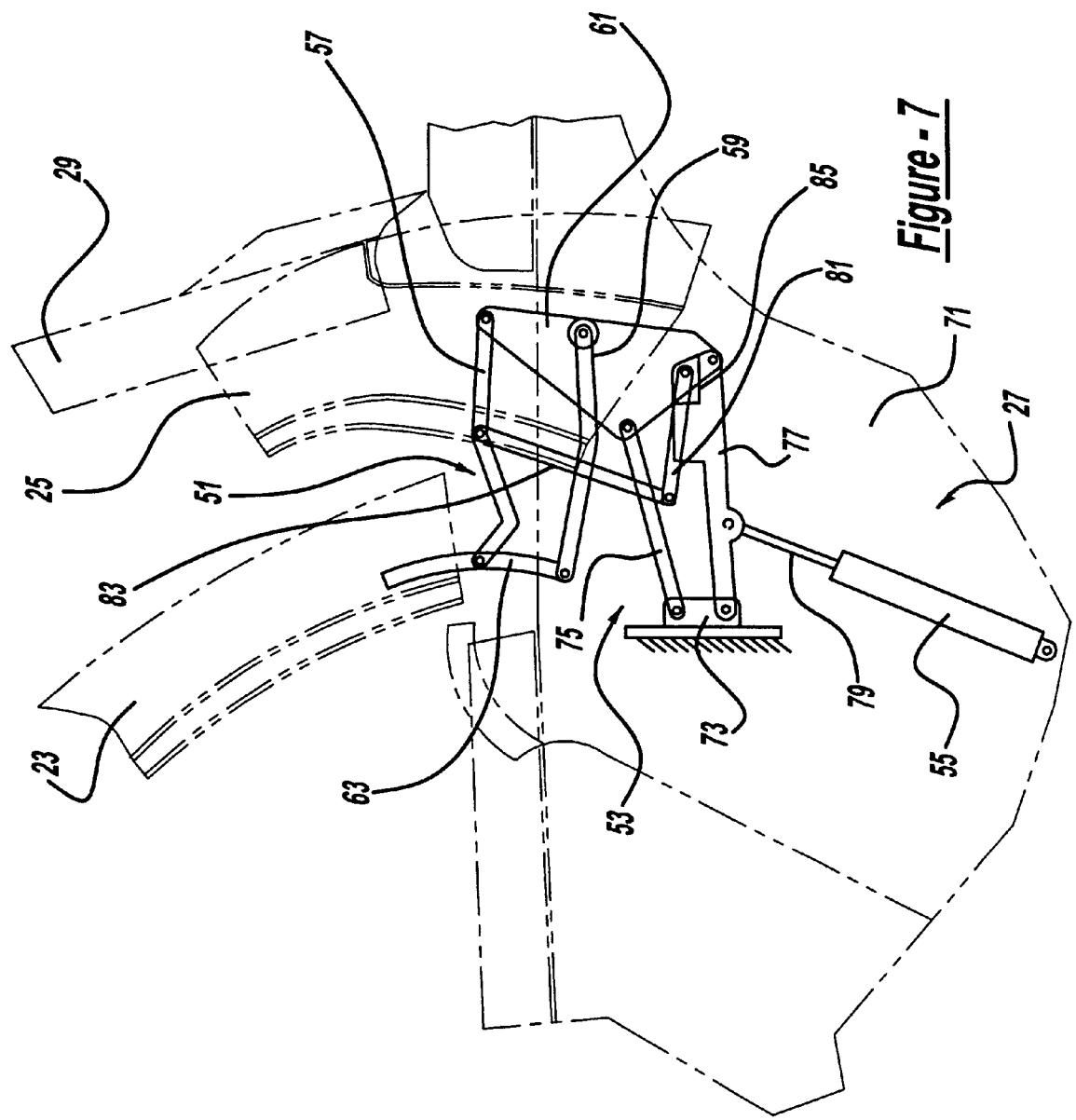
FIG. 7 is a side diagrammatic view showing the top stack mechanism employed in the preferred embodiment hard-top convertible roof system, disposed in the partially retracted position.
Figure 8:
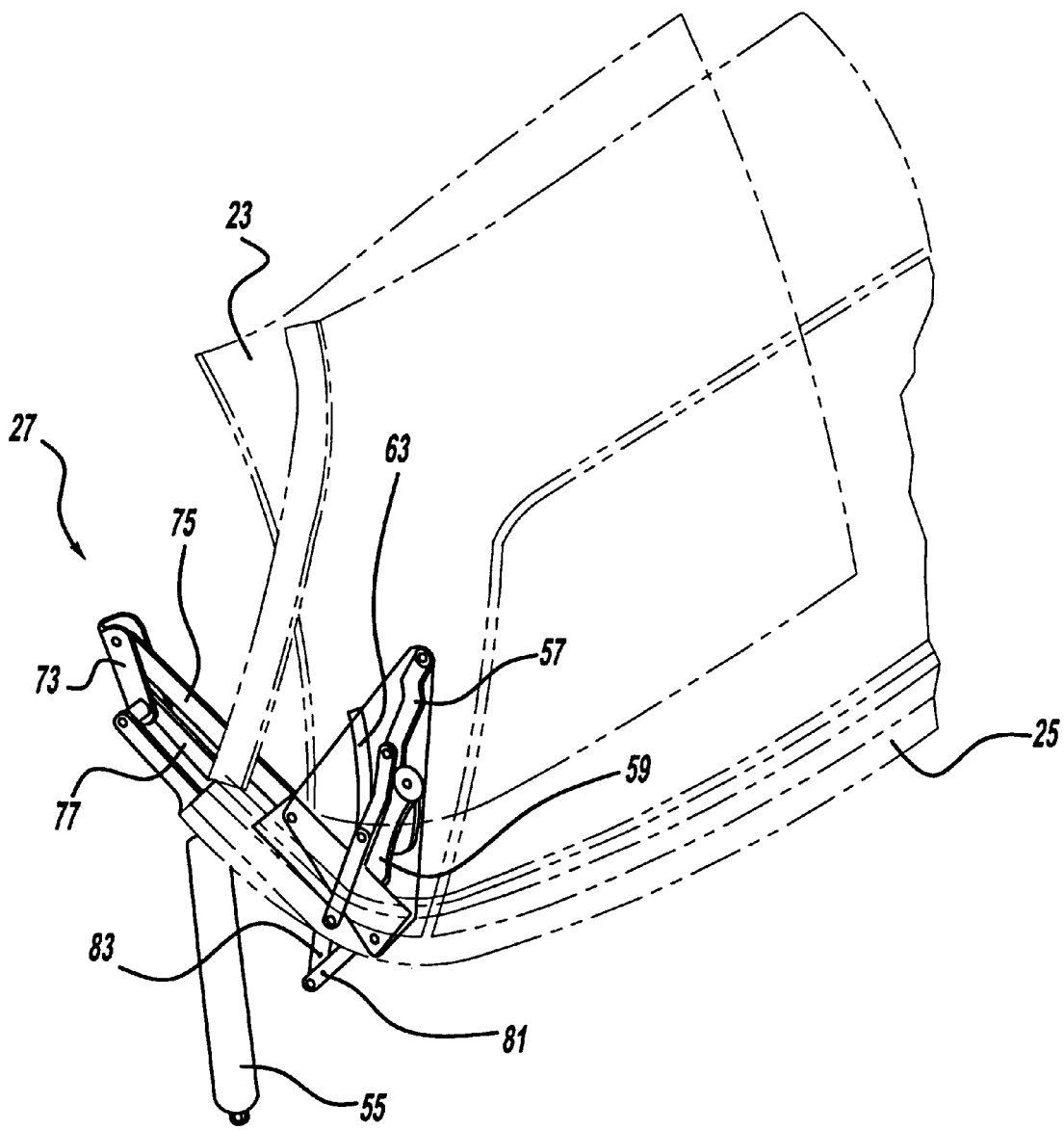
FIG. 8 is a perspective view, like that of FIG. 1, showing the top stack mechanism employed in the preferred embodiment hard-top convertible roof system, disposed in the fully retracted position.
Figure 9:
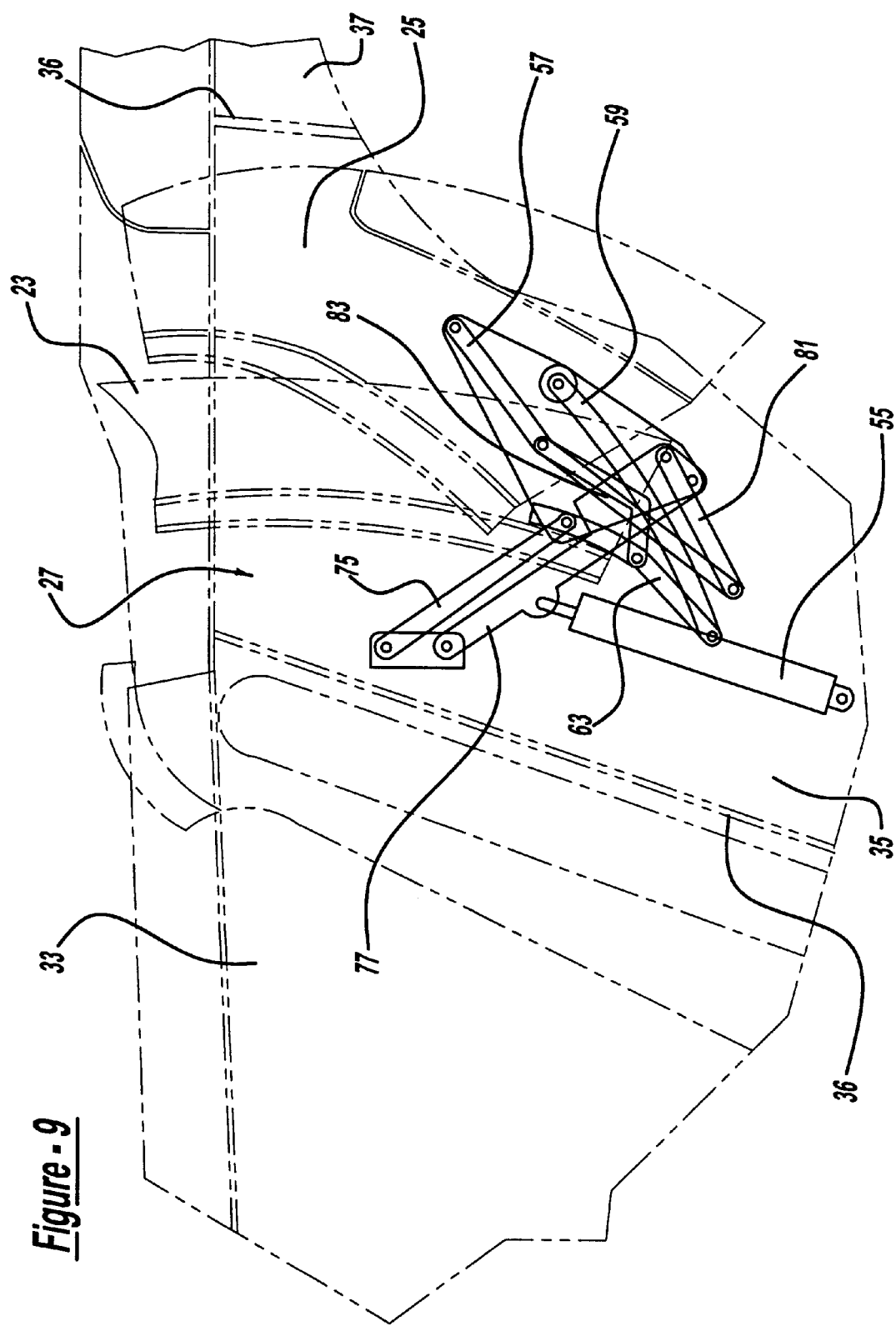
FIG. 9 is a side diagrammatic view showing the top stack mechanism employed in the preferred embodiment hard-top convertible roof system, disposed in the fully retracted position.
Figure 10:
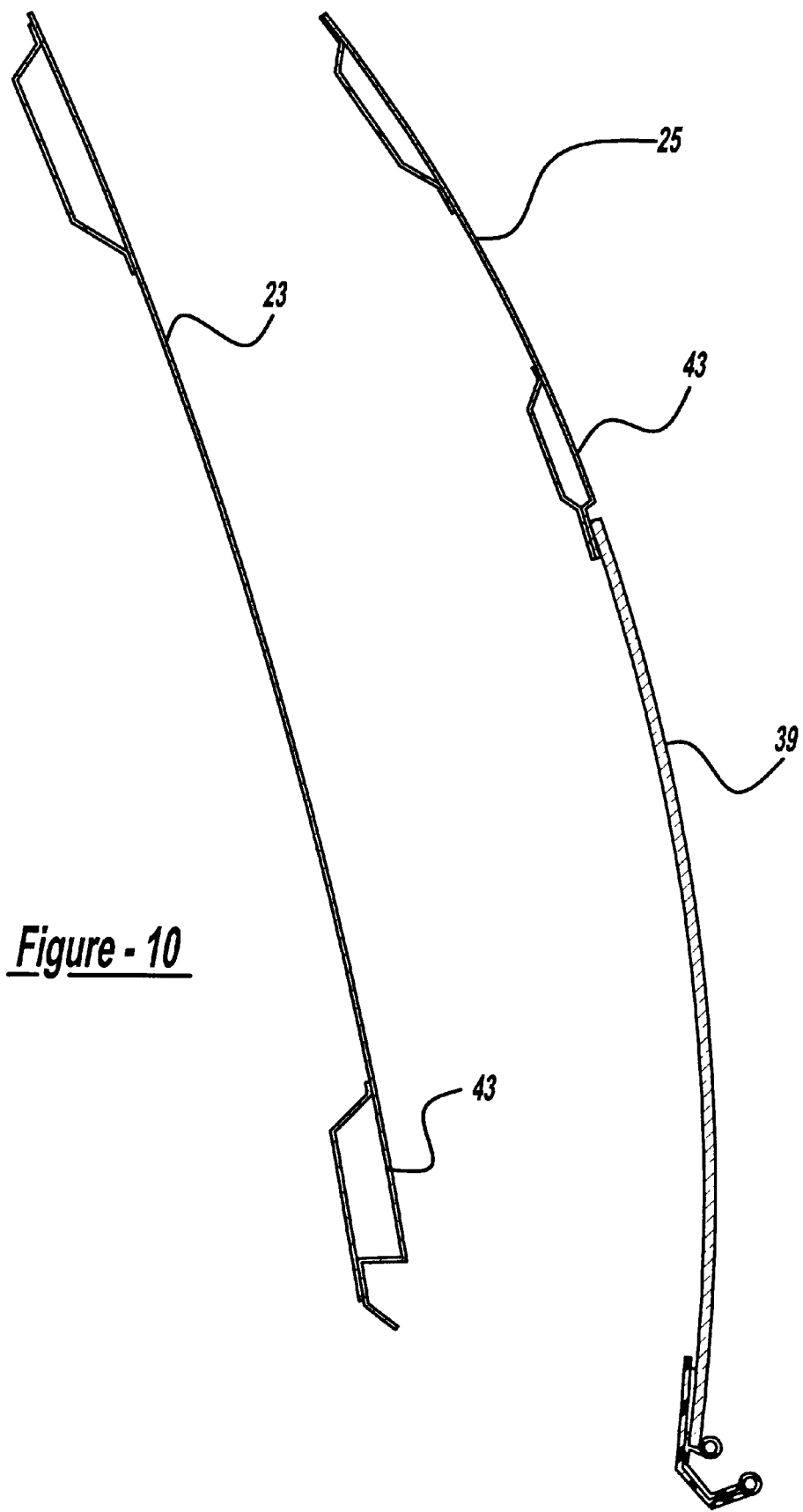
FIG. 10 is a centerline cross sectional view, taken along line 10—10 of FIG. 3, showing the preferred embodiment hard-top convertible roof system.
Figure 11:
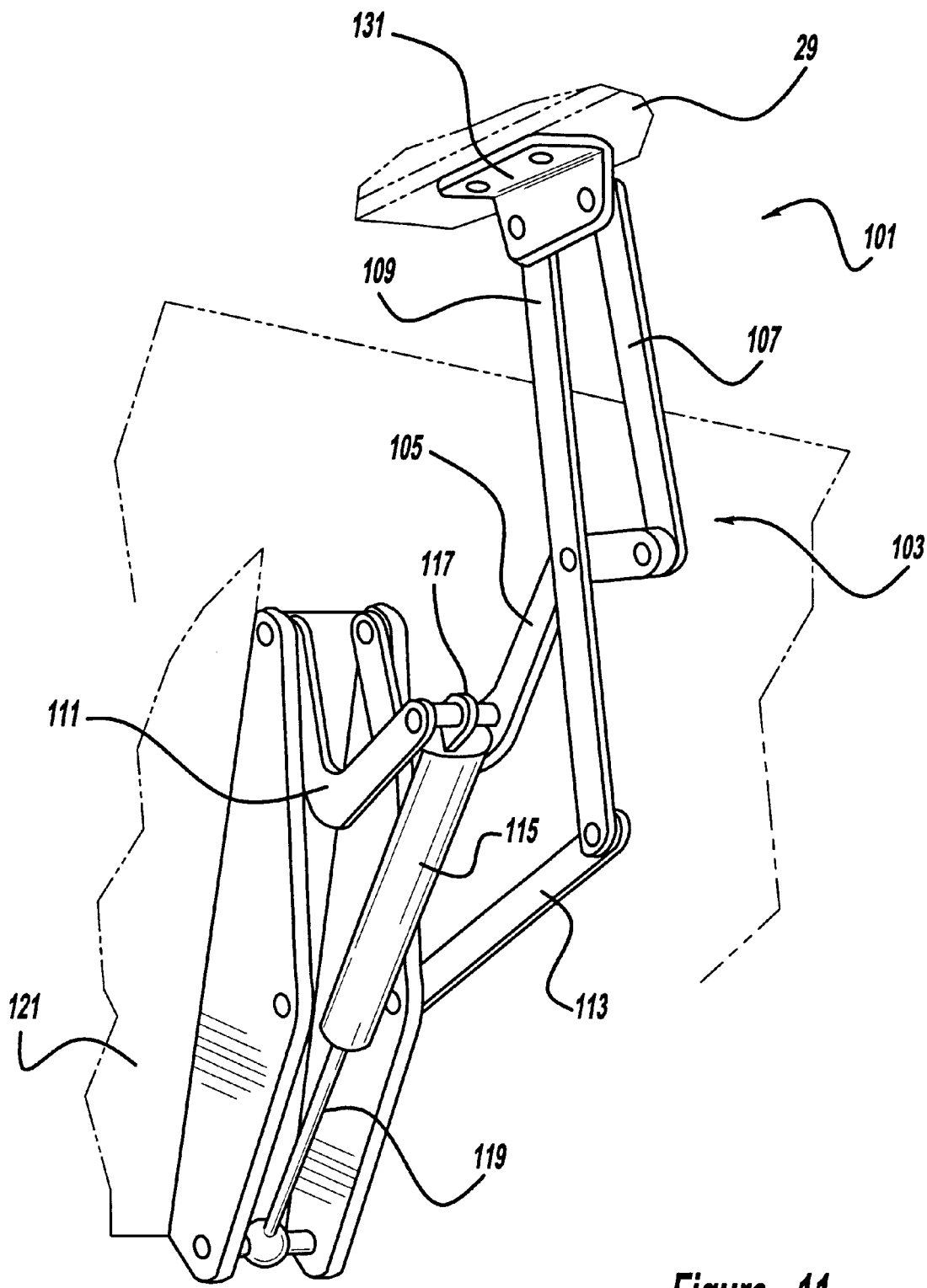
FIG. 11 is a front perspective view showing the tonneau cover mechanism employed in the preferred embodiment hard-top convertible roof system, disposed in a partially open position.
Figures 12, 13:
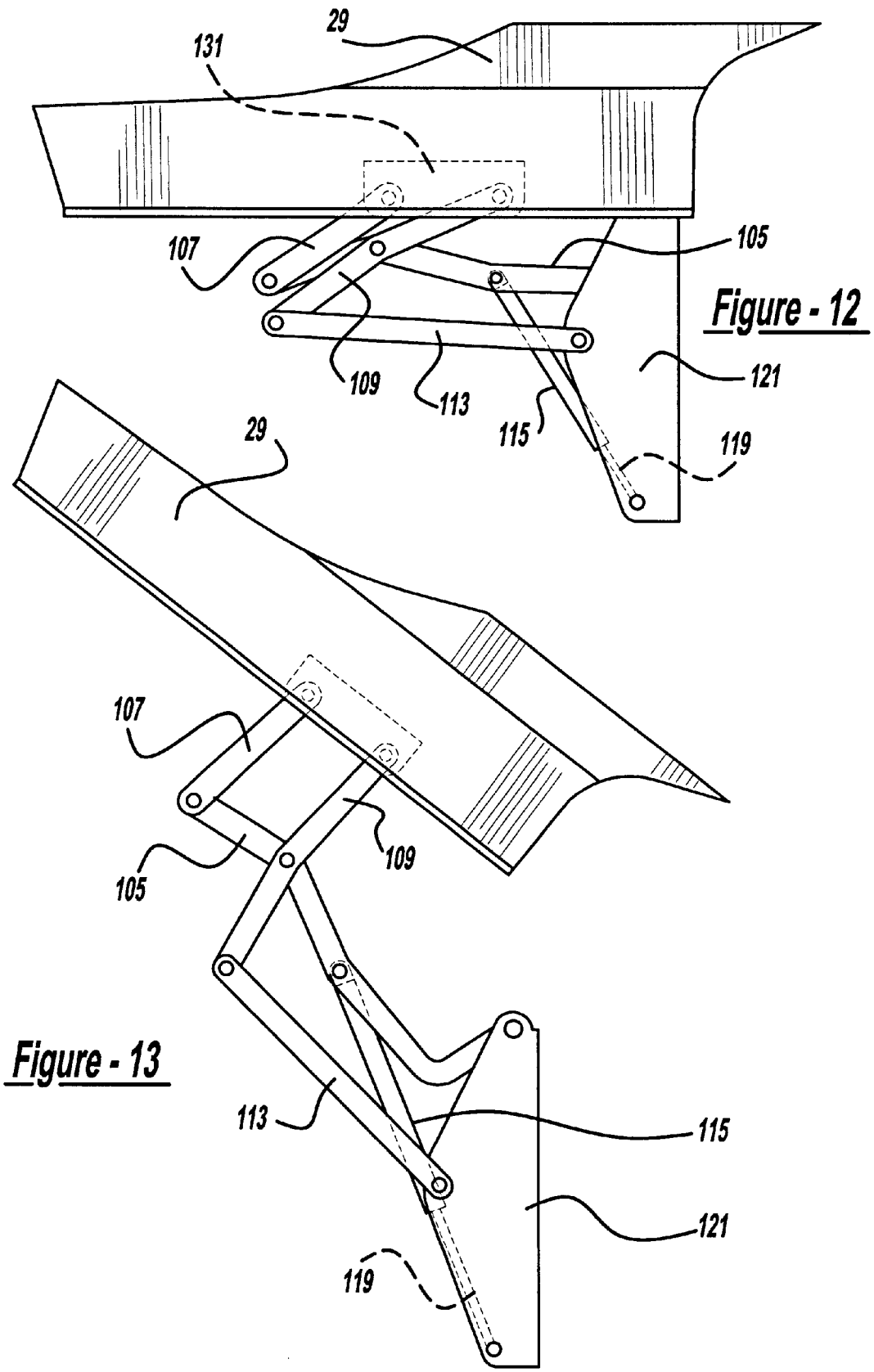
FIG. 12 is a side elevational view showing the tonneau cover mechanism employed in the preferred embodiment hard-top convertible roof system, disposed in a fully closed position.
FIG. 13 is a side elevational view showing the tonneau cover mechanism employed in the preferred embodiment hard-top convertible roof system, disposed in a partially open position.
Figure 14:
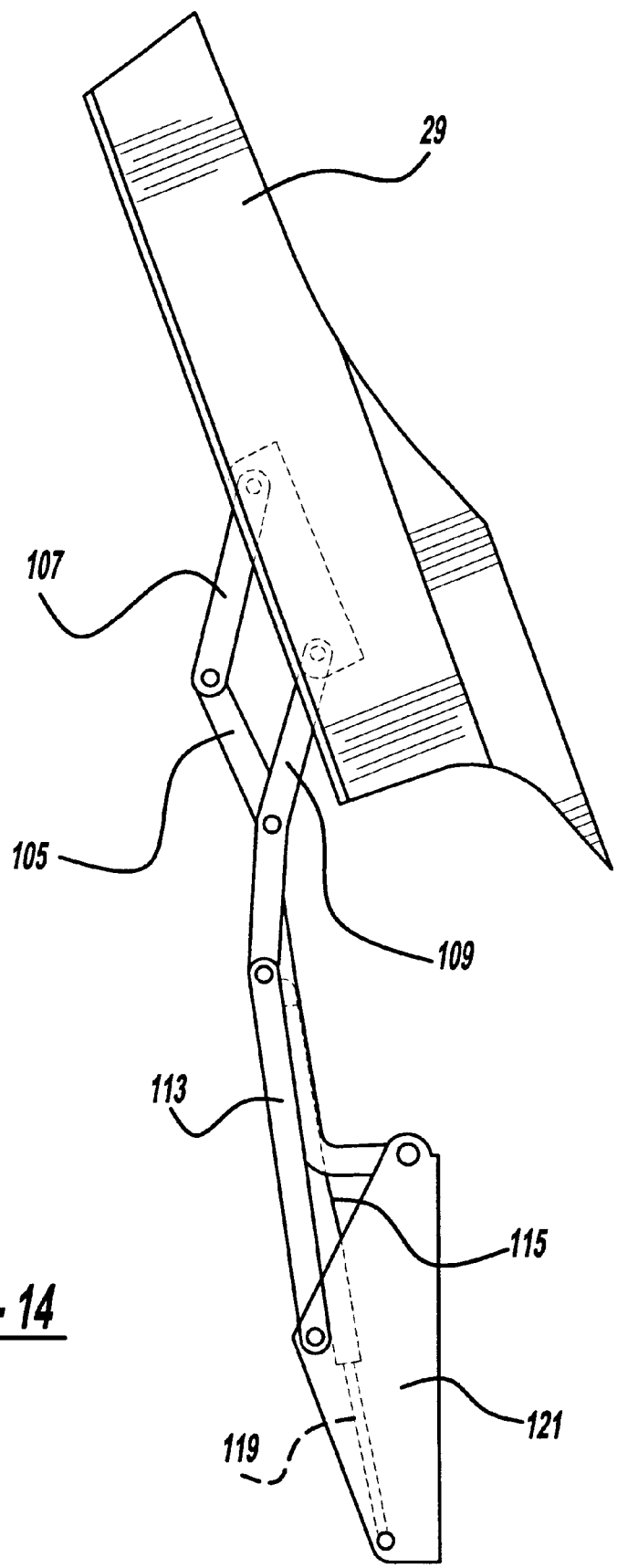
FIG. 14 is a side elevational view showing the tonneau cover mechanism employed in the preferred embodiment hard-top convertible roof system, disposed in a fully open position.

Referring to FIGS. 1–3 and 10, a convertible roof system 21 is part of an automotive vehicle and includes a hard-top front roof 23, a hard-top rear roof 25, a top stack mechanism 27 operable to move the roofs, a rigid tonneau cover 29 and a tonneau cover mechanism 31. Roofs 23 and 25 are automatically movable from fully raised and closed positions covering a passenger compartment 33, as shown in FIG. 1, to fully retracted and open positions, as shown in FIGS. 3 and 10, wherein roofs 23 and 25 are stowed in a roof storage area or compartment 35. Roof storage compartment 35 is located between and physically separated by metal panels 36 (see FIG. 9) from passenger compartment 33 and an externally accessible storage area for miscellaneous articles such as a trunk or pickup truck bed 37. A rigid, glass back window or backlite 39 is secured to rear roof 25 while front roof 23 is disengagably attached to a front header panel 41 by latches. Weatherstrips or seals are also employed around the peripheral edges of roofs 23 and 25. Roofs 23 and 25 are preferably stamped from aluminum or steel sheets and include inner reinforcement panels, but the roofs may alternately be formed from polymeric composites. Roofs 23 and 25 have opaque outside surfaces 43 that are typically painted. These outside surfaces 43 define three-dimensionally curved planes which are stored in a predominantly vertical and parallel nested orientation when fully retracted and stowed; this can be observed best in FIGS. 9 and 10.

Top stack mechanism 27 is in mirrored symmetry in both outboard sides of the vehicle and will only be described for the left-hand side with reference to FIGS. 4 through 9. Top stack mechanism 27 includes a first four-bar linkage assembly 51, a second four-bar linkage assembly 53 and a primary hydraulic actuator 55. First, four-bar linkage assembly 51 couples front roof 23 to rear roof 25 and includes a pair of somewhat parallel links 57 and 59 (as viewed in FIGS. 6 and 7) pivotally attached to a rear roof-mounted plate 61. The opposite ends of links 57 and 59 are pivotally joined to a single link 63 which rearwardly extends from front roof 23 and is attached to an outboard side rail area of front roof 23. Single link 63 can alternately be considered a rearwardly extending bracket bolted to the side rail reinforcement structure of the front roof.

Second four-bar linkage assembly 53 couples rear roof 25 to the vehicle body 71 by way of a stationarily mounted bracket 73 welded, bolted or otherwise secured to an inner quarter panel or the like. Second four-bar linkage assembly 53 includes a pair of somewhat parallel links 75 and 77 (as viewed in FIGS. 6 and 7) which each have a proximal end pivotally coupled to bracket 73. A distal end of link 75 is pivotally coupled to plate 61 attached to rear roof 25. A distal end of link 77 is enlarged and is pivotally attached to plate 61.

An end of a linearly extendable piston rod 79 of hydraulic actuator 55 is pivotally coupled to an intermediate or middle section of link 77. Furthermore, a control linkage mechanism couples together first and second four-bar linkages, respectively 51 and 53. Control linkage mechanism includes a first drive link 81 and a second drive link 83 pivotally coupled to the first drive link. An end of first drive link 81 is pivotally coupled to the enlarged section of link 77 while an end of drive link 83 is pivotally coupled to a middle or intermediate section of link 57. A hydraulically actuated rotary actuator 85 has a housing mounted to the enlarged section of link 77 and has a rotatable output gear or shaft which engages a splined receptacle of link 81 and operably causes link 81 to rotate relative to link 77. Rotary actuator 85 can be obtained from either Power Packer Co. of Germany or Hoerbriger Co. of Germany.

Roofs 23 and 25 can be tightly and closely nested together when fully retracted and the centerline, fore-and-aft roof storage area opening can be minimized due to the four-bar linkages 51 and 53, rotary actuator 85 and links 81 and 83. Furthermore, the four-bar linkage arrangements provide for very powerful and balanced movement, both between the vehicle body and the rear roof, and also between the roofs themselves, with very compact retracting and advancing space and with relatively short and tightly packaged links. Accordingly, only a single link attaches each outboard edge of front roof 23 to the remainder of the top stack mechanism and no difficult to package balance links are required with this preferred embodiment system. Guides, tracks and cables are also not necessary with the presently preferred embodiment since the present invention can be very easily mounted to the vehicle through the easy to attach bracket 73 and hydraulic actuator 55 body mounting. This non-guide construction also reduces side-to-side binding during roof movement. It should be appreciated, however, that a balance link, extra front roof attachments or guides can be alternately employed, but certain advantages of the present invention would be sacrificed.

A tonneau cover mechanism 101 and tonneau cover 29 are best shown in FIGS. 11–14; only one side will be discussed since the other is symmetrical. Tonneau cover mechanism 101 includes a scissor linkage assembly 103 having an arcuate gooseneck link 105, a pair of parallel links 107 and 109, a follower gooseneck link 111 and a straight trailing link 113. A hydraulic actuator 115 has a cylinder end 117 pivotally coupled to a distal end of follower gooseneck link 111 and an intermediate section of gooseneck link 105. An end of a linearly extendable piston rod 119 of actuator 115 is pivotally coupled between projecting walls of a stationary, body-mounted bracket 121. Proximal ends of gooseneck link 105 and follower gooseneck link 111 are also pivotally coupled to bracket 121. A proximal end of trailing link 113 is similarly pivotally coupled to bracket 121. A distal end of trailing link 113 is pivotally attached to link 109. An opposite end of link 109 is pivotally mounted to an L-shaped support 131 which, in turn, is fastened to an inside surface of tonneau cover 29. Link 107 also has a first end pivotally coupled to support 131 and an opposite end pivotally attached to a straight distal end of gooseneck link 105.

Tonneau cover mechanism 101 defines a six-bar linkage arrangement. Accordingly, when a hydraulic pump 133 (see FIG. 5) is energized, tonneau cover mechanism 101 will cause tonneau cover 29 to vertically raise while simultaneously rearwardly pivoting from the closed position of FIG. 12 to the open position of FIG. 14. This allows roofs 23 and 25 to enter roof storage area 35 (see FIGS. 2 and 9). Tonneau cover 29 will be automatically returned to its closed position in order to cover and externally hide the stowed roofs. All of the top stack mechanism actuators and tonneau cover actuators may be controlled in accordance with the control system disclosed in U.S. Pat. No. 5,451,849 entitled "Motorized Self-Correcting Automatic Convertible Top" which issued to Porter et al. on Sep. 19, 1995, which is incorporated by reference herein.

Figure 15:
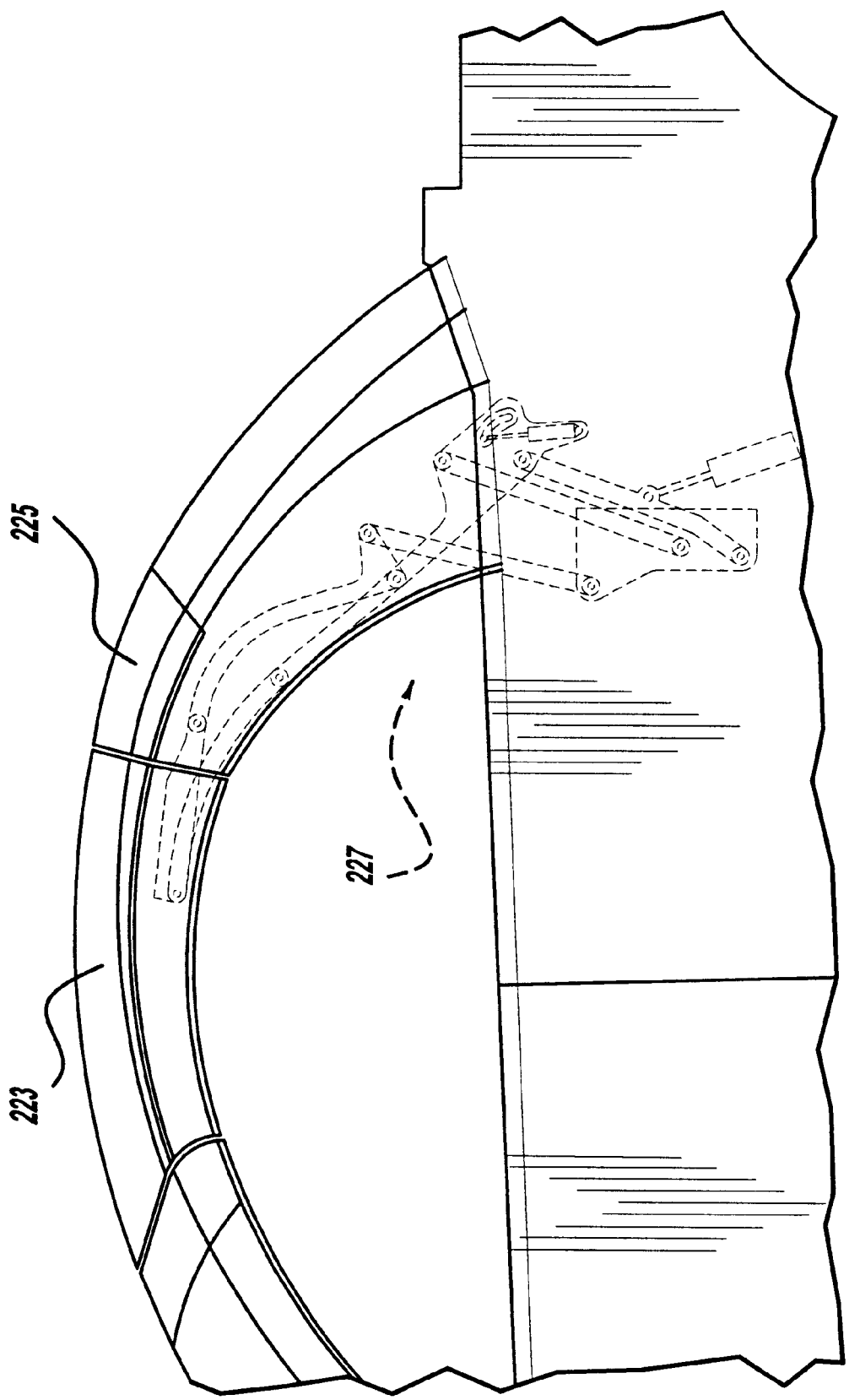
FIG. 15 is a side elevational view showing an alternate embodiment hard-top convertible roof system of the present invention disposed in a fully closed position.
Figure 16:
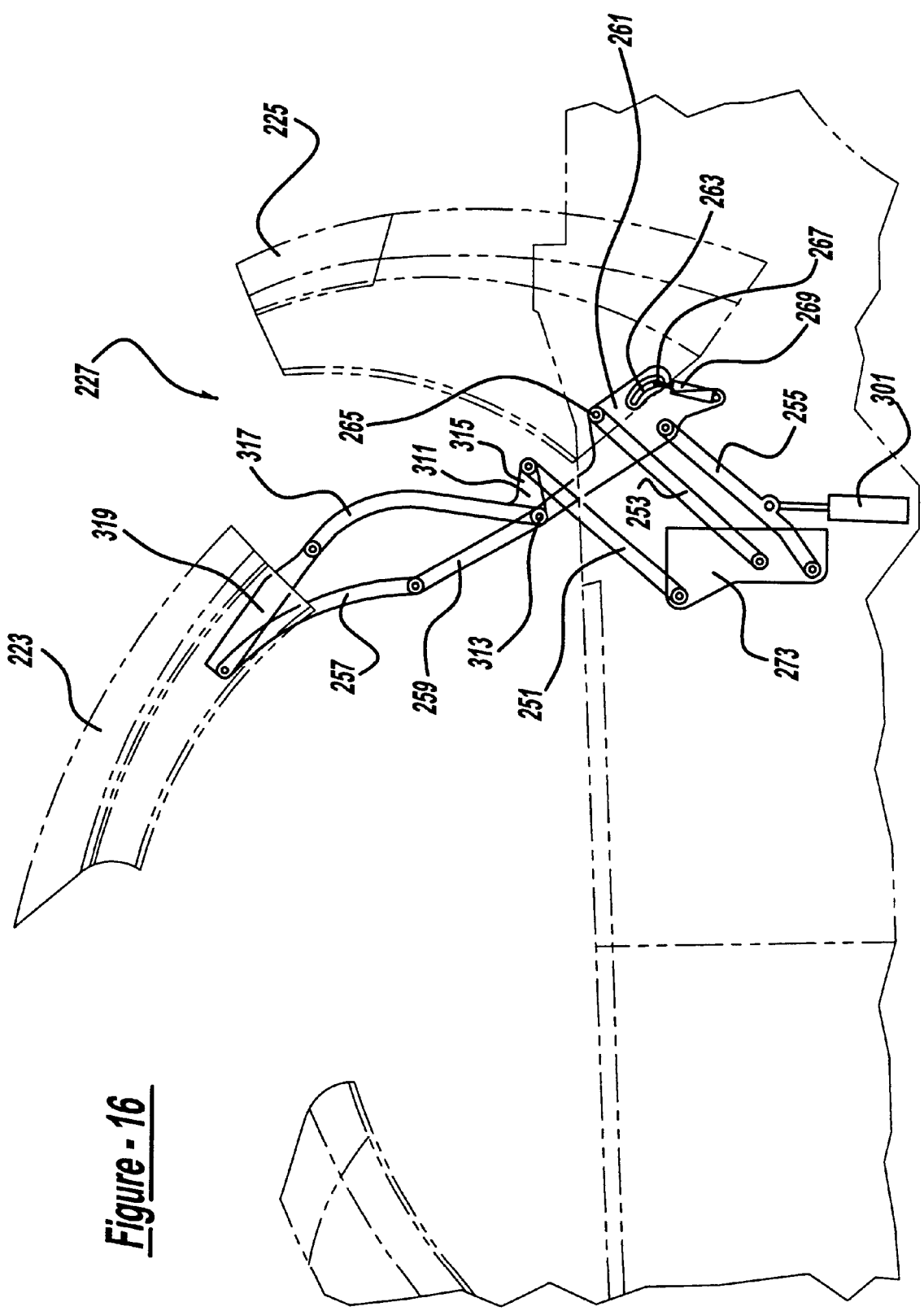
FIG. 16 is a side diagrammatic view showing a top stack mechanism employed in the alternate embodiment hard-top convertible roof system, disposed in a partially retracted position.
Figure 17:
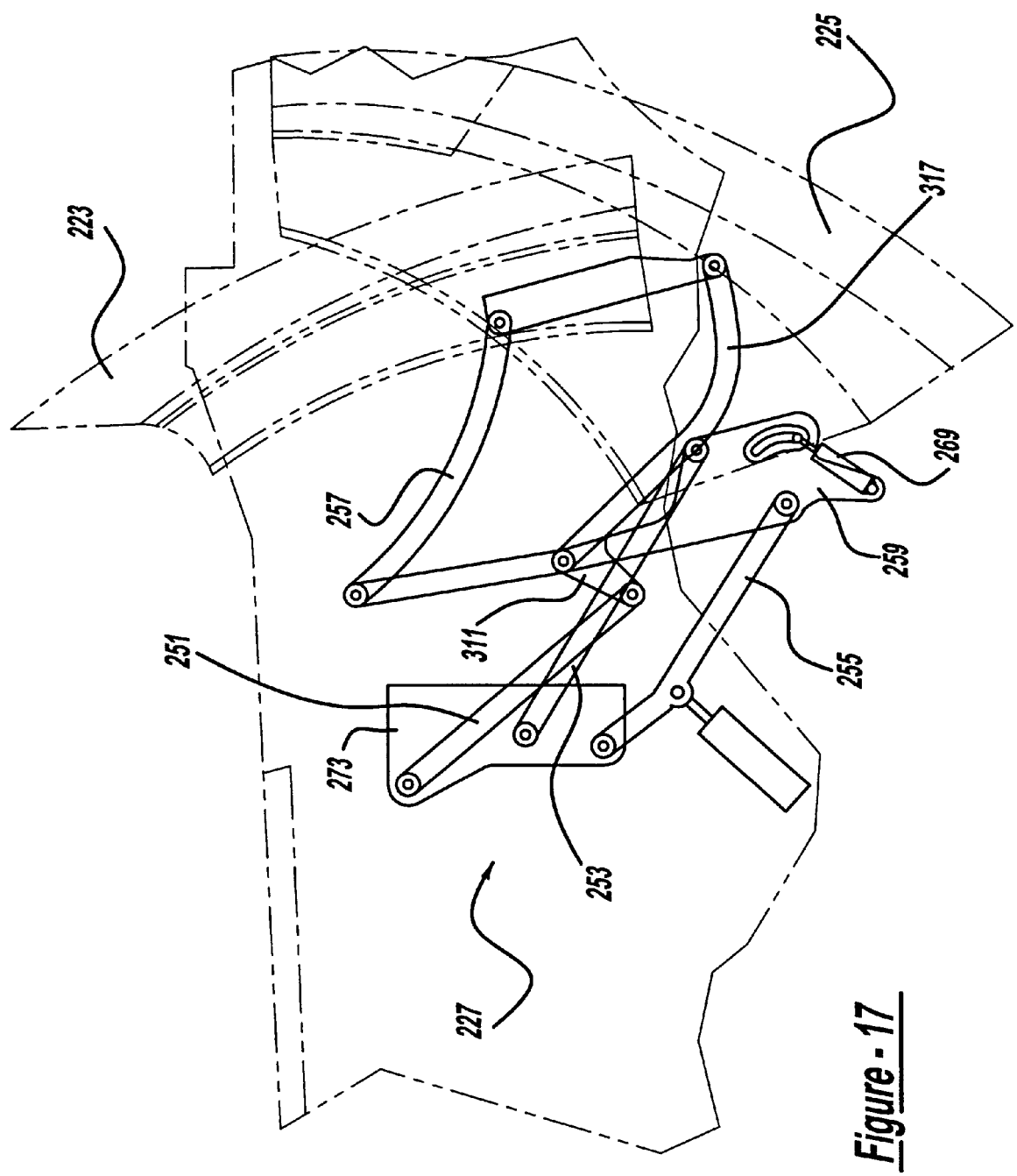
FIG. 17 is a side diagrammatic view showing the top stack mechanism employed in the alternate embodiment hard-top convertible roof system, disposed in a further partially retracted position.
Figure 18:
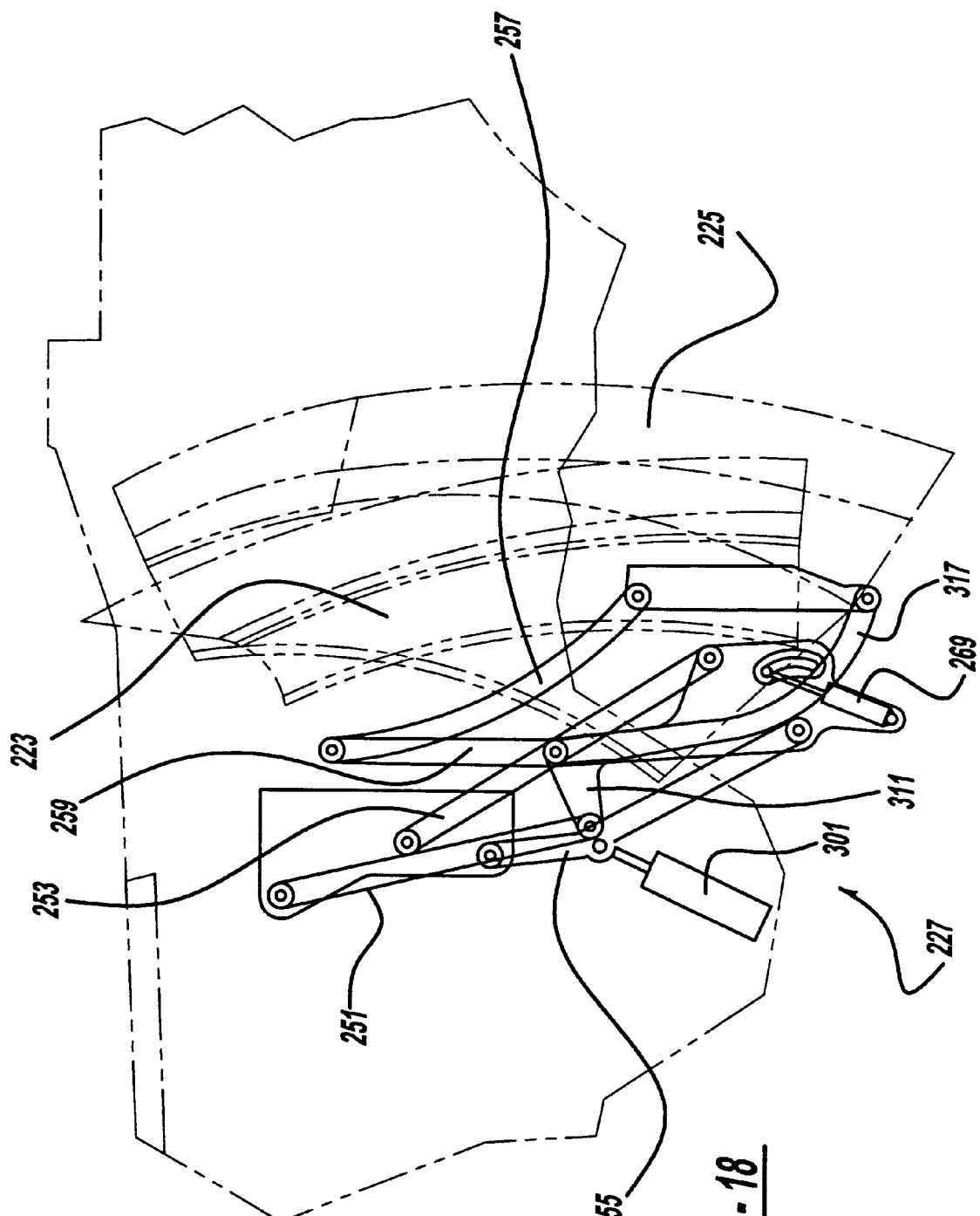
FIG. 18 is a side diagrammatic view showing the top stack mechanism in the alternate embodiment hard-top convertible roof system, disposed in a fully retracted position.

An alternate embodiment hard-top convertible roof system is illustrated in FIGS. 15–19. A hard-top front roof 223 and a hard-top rear roof 225 are movable from a fully raised position, as shown in FIG. 15, to a fully retracted and open position, as shown in FIG. 18, by way of a top stack linkage mechanism 227. Top stack mechanism 227 includes three primary links 251, 253 and 255 which all have proximal ends pivotally attached to a stationary, body-mounted bracket 273. A secondary linkage mechanism of top stack mechanism 227 includes a curved forward link 257 and a rear link 259. Rear link 259 has an enlarged end section 261 with an arcuately shaped camming surface or slot 263. Distal ends of primary links 253 and 255 are pivotally coupled to enlarged section 261 of rear link 259. Rear roof 225 is coupled to rear link 259 and the primary links 253 and 255 at pivot points 265 and 267.

Figure 19:
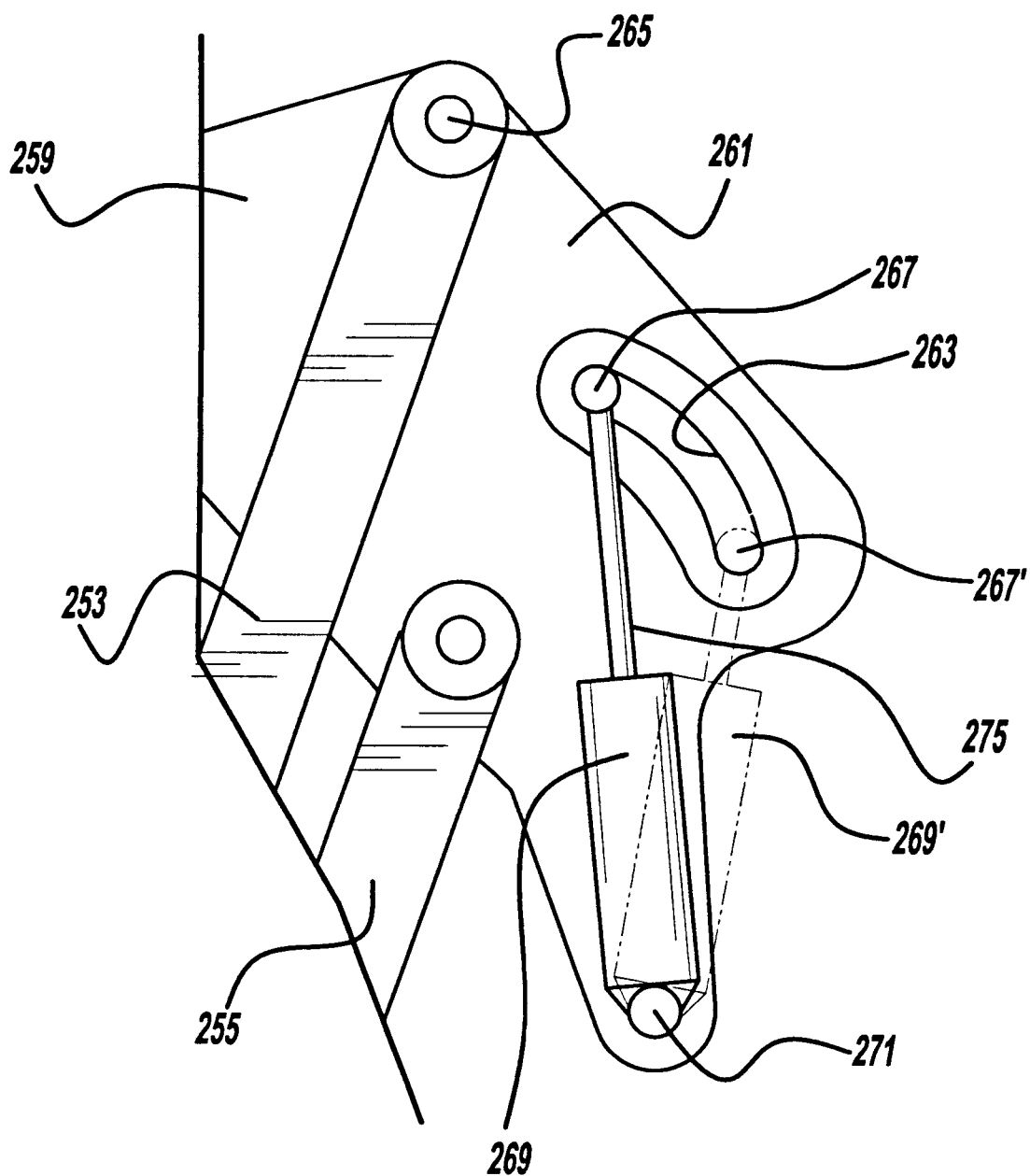
FIG. 19 is an enlarged side elevational view showing a supplemental automatic actuator of the top stack mechanism employed in the alternate embodiment hard-top convertible roof system.

A supplemental actuator 269 has a first end pivotally secured to rear link 259 at a fixed pivot axis 271; this can best be observed by reference to FIG. 19. Supplemental actuator 269 is preferably a relatively small hydraulic cylinder having a linearly movable piston rod 275 with a rod end attached to pivot 267 of rear roof 225 (see FIG. 16). Thus, pivot 267 acts as a cam follower relative to camming slot 263, whereby energization of actuator 269 causes rear roof pivot 267 to move along the camming slot path in order to rotate rear roof about the fixed pivot axis corresponding to pivot 265. This movement serves to further tighten the nested front and rear roofs and minimize their required fore-and-aft packaging space when in the stored position shown in FIG. 18. In other words, retracted actuation of primary hydraulic actuator 301 will cause the gross retracted movement from the position shown in FIG. 15 to that shown in FIG. 17. Primary actuator 301 will further cause top stack mechanism 227 to completely collapse to its retracted position. Supplemental actuator 269 will automatically provide fine motion control of rear roof 225 when top stack mechanism 227 is moved between the positions shown in FIGS. 17 and 18. The final retracted forward rotation of rear roof 225 is caused by energization of supplemental actuator 269 which enables rear roof 225 to become much closer to the fully retracted front roof 223 and provide a smaller stowed package. Reverse advancing movement is opposite that described. If desired, this fine supplemental movement can alternately occur concurrently while the rear roof is also moving through the body opening of the roof storage space.

It should be appreciated that this supplemental fine movement motion can also be applied to a fabric covered, soft-top roof or to a horizontally stowed hard-top roof system. Exemplary soft-top roofs are disclosed in U.S. Pat. Nos. 5,903,119 entitled "Convertible Roof Actuation Mechanism" which issued to Laurain et al. on May 11, 1999, and 5,772,274 entitled "Motorized Drive System for a Convertible Roof of an Automotive Vehicle" which issued to Tokarz on Jun. 30, 1998, both of which are incorporated by reference herein. The supplemental actuator would have the cylinder attached to one link and the end of the piston rod attached to another link.

A bellcrank 311 has a central pivot 313 attached to an intermediate section of roof link 259. A short offset bellcrank arm 315 has an end pivotally coupled to a distal end of primary link 251 while an end of an elongated bellcrank arm 317 is pivotally coupled to a front roof bracket 319 or roof inner structure. Front roof bracket 319 is also pivotally coupled to an end of forward link 257. Accordingly, energized movement of primary actuator 301 causes primary link 255 to rotate rear link 259 and rear roof 225 about pivot 265. This motion further causes bellcrank 311 to be rotated by primary link 251 relative to rear link 259. This bellcrank motion serves to rotate and collapse front roof 223 relative to rear roof 225.

While various embodiments of the hard-top convertible roof system have been disclosed, it should be appreciated that variations may be made to the present invention. For example, additional or fewer links may be employed in the presently disclosed top stack mechanisms. Furthermore, the hard-top roofs can be covered with vinyl, fabric or painted, or can include transparent glass panels. Moreover, electric motor actuators can be used in place of one or more of the disclosed hydraulic actuators. It should also be appreciated that the trunk compartment can be in front of the passenger compartment for a mid or rear engine vehicle. While various materials and shapes have been disclosed, it should be appreciated that various other shapes and materials can be employed. It is intended by the following claims to cover these and any other departures from the disclosed embodiments which fall within the true spirit of this invention.

The invention claimed is:

1. A convertible roof system comprising:
a front hard-top roof movable from a closed position to an open position;
a rear hard-top roof movable from a closed position to an open position;
an automatic actuator;
a top stack mechanism coupling the actuator to the hard-top roofs and each other, the top stack mechanism including a single link attached adjacent each outboard side of the front roof and rearwardly extending from the front roof, the remainder of top stack mechanism and the rear roof only being coupled to the front roof by each single link; and
at least one vehicle body-mounted bracket;
the top stack mechanism further including at least first and second rear links coupling the rear roof to the at least one bracket, ends of the first and second rear links being mounted to the at least one bracket and being offset from each other, opposite ends of the first and second rear links being attached to structure affixed to and always moving with the rear roof;

outside surfaces of the roofs having a substantially vertical orientation when in the open positions.

2. The system of claim 1 wherein the top stack mechanism further includes a four-bar linkage assembly operable to move the rear roof.

3. The system of claim 2 wherein the four-bar linkage assembly includes:

a stationary body-mounted bracket;

a first link having a first pivot coupled to the bracket and a second pivot coupled adjacent a lower edge of the rear roof; and a second link having a first pivot coupled to the bracket, a second pivot located adjacent the lower edge of the rear roof, and a third pivot coupled to the actuator.

4. The system of claim 3 wherein the top stack mechanism further includes a second linkage assembly coupling the front roof link to at least one of the first and second links of the four-bar linkage assembly.

5. The system of claim 1 further comprising a roof storage compartment, a second storage compartment and a passenger compartment, the roofs being stored in the roof storage compartment without encroaching upon the space of the second storage compartment when the roofs are in their open positions, at least one of the roofs covering the passenger compartment when in the closed position.

6. The system of claim 5 further comprising a rigid panel separating the roof storage compartment from the second storage compartment.

7. The system of claim 5 wherein the second storage compartment is a pickup truck bed.

8. The system of claim 5 wherein the second storage compartment is a trunk.

9. The system of claim 1 wherein the outside surfaces of the roofs are oriented in a substantially parallel and rearward facing direction when in their open positions.

10. The system of claim 9 wherein the front roof is nested forward of the rear roof when in their open positions.

11. The system of claim 1 further comprising:

a rigid tonneau cover movable from a closed position, hiding at least a portion of the open roofs, to an open position;

a tonneau linkage mechanism operably moving the tonneau cover between its positions; and an automatic tonneau actuator coupled to and operably driving the tonneau linkage mechanism.

12. The system of claim 11 wherein the actuators are hydraulically operated.

13. The system of claim 1 further comprising a second actuator moveable with at least one of the roofs, the top stack mechanism including a four-bar linkage assembly coupling the front roof to the rear roof, and the second actuator automatically driving the four-bar linkage assembly.

14. A convertible roof system for use on an automotive vehicle having a vehicle body, the system comprising:

a first roof section movable from a closed position to an open position;

a second roof section movable from a closed position to an open position, a majority of at least one of the roof sections being substantially rigid;

at least a first four-bar linkage assembly coupling the first roof section to the second roof section; and at least a second four-bar linkage assembly coupling the second roof section to the vehicle body, a structure always moving with the second roof section defining one of the bars in the second four-bar linkage assembly;

wherein external surfaces of the roof sections are oriented in a substantially parallel and rearwardly facing direction when in their open positions.

15. The system of claim 14 further comprising a roof storage compartment and a second storage compartment, the roof sections being stored in the roof storage compartment without encroaching upon the space of the second storage compartment when the roof sections are in their open positions.

16. The system of claim 15 further comprising a rigid panel separating the roof storage compartment from the second storage compartment.

17. The system of claim 14 wherein the first roof section is a front roof, and at least a majority of the front roof is a rigid hard-top roof with a totally opaque external surface.

18. The system of claim 14 wherein the first roof section is a front roof which is nested forward of the second roof section, which is a rear roof, when the roof sections are in their open positions.

19. The system of claim 14 wherein the first roof section and the second roof section are automatically retractable hard-top roofs.

20. A convertible roof system for use on an automotive vehicle having a vehicle body, the system comprising:

a first roof section movable from a closed position to an open position;

a second roof section movable from a closed position to an open position, a majority of at least one of the roof sections being substantially rigid;

at least a first four-bar linkage assembly coupling the first roof section to the second roof section; and at least a second four-bar linkage assembly coupling the second roof section to the vehicle body, a structure always moving with the second roof section defining one of the bars in the second four-bar linkage assembly; and a roof storage compartment and a second storage compartment, the roof sections being stored in the roof storage compartment without encroaching upon the ace of the second storage compartment when the roof sections are in their open positions;

wherein the second storage compartment is a pickup truck bed.

21. The system of claim 20 wherein external surfaces of the first and second roof sections are retracted to substantially parallel orientations facing substantially the same direction in an overlapping manner.

22. The system of claim 20 wherein at least one of the roof sections defines a hard-top roof section.

23. A convertible roof system for use on an automotive vehicle having a vehicle body, the system comprising:

a first roof section movable from a closed position to an open position;

a second roof section movable from a closed position to an open position, a majority of at least one of the roof sections being substantially rigid;

at least a first four-bar linkage assembly coupling the first roof section to the second roof section; and at least a second four-bar linkage assembly coupling the second roof section to the vehicle body, a structure always moving with the second roof section defining one of the bars in the second four-bar linkage assembly;

a roof storage compartment and a second storage compartment, the roof sections being stored in the roof storage compartment without encroaching upon the space of the second storage compartment when the roof sections are in their open positions;

wherein the second storage compartment is a trunk.

24. The system of claim 23 wherein external surfaces of the roof sections are oriented in a substantially parallel and rearwardly facing direction when in their open positions.

25. The system of claim 23 wherein the first roof section is retracted to a substantially vertical position.

26. The system of claim 25 wherein the second roof section is retracted to a substantially vertical position.

27. The system of claim 23 wherein the first and second roof sections defines a hard-top roof section.

28. A convertible roof system for use on an automotive vehicle having a vehicle body, the system comprising:

a first roof section movable from a closed position to an open position;

a second roof section movable from a closed position to an open position, a majority of at least one of the roof sections being substantially rigid;

at least a first four-bar linkage assembly coupling the first roof section to the second roof section;

at least a second four-bar linkage assembly coupling the second roof section to the vehicle body, a structure always moving with the second roof section defining one of the bars in the second four-bar linkage assembly; and an automatically powered actuator coupled to the second four-bar linkage assembly;

wherein the roof sections are oriented in a substantially vertical direction when in their open positions.

29. A convertible roof system for use on an automotive vehicle having a vehicle body, the system comprising:

a first roof section movable from a closed position to an open position;

a second roof section movable from a closed position to an open position, a majority of at least one of the roof sections being substantially rigid;

at least a first four-bar linkage assembly coupling the first roof section to the second roof section; and at least a second four-bar linkage assembly coupling the second roof section to the vehicle body, a structure always moving with the second roof section defining one of the bars in the second four-bar linkage assembly;

wherein for each side of the vehicle, the first four-bar linkage assembly includes a front roof link mounted to the first roof section, the front roof link being the only member drivably coupling each side of the first roof section to the second roof section.

30. The system of claim 29 wherein the first and second roof sections are stowed in a substantial vertical direction.

31. An automotive vehicle comprising:

a front hard-top roof having an external surface;

a rear hard-top roof having an external surface;

a first linkage assembly coupling the front roof to the rear roof;

an automotive vehicle body having a roof storage area and a second storage area;

a second linkage assembly coupling the rear roof to the vehicle body without the use of a slide and track device mounted to the vehicle body;

at least one control link coupling the first linkage assembly to the second linkage assembly;

a rigid tonneau cover automatically movable from a closed position, substantially flush with the adjacent vehicle body and covering at least a portion of the roof storage area, to an open position allowing access of the front and rear roofs to the roof storage area; and a tonneau cover linkage mechanism movably coupling the tonneau cover to the vehicle body;

the external surfaces of the front and rear roofs being automatically retracted to substantially vertical positions facing substantially the same direction in a nested relationship, when stowed in the roof storage area;

a rear edge of the front roof being located adjacent a forward edge of the rear roof when the front and rear roofs are in closed positions; and the second storage area being externally accessible for miscellaneous storage even when the front and rear roofs are located in the roof storage area.

32. The vehicle of claim 31 wherein the second storage area is a pickup truck bed.

33. The vehicle of claim 31 wherein the roof storage area is forward of and physically separated from the second storage area which is a trunk.

34. The vehicle of claim 31 further comprising a first fluid actuator coupled to the second linkage assembly and a second automatic actuator coupled to the first linkage assembly, the second actuator having a rotatable output member, and the entire second actuator operably moving with at least one of the roofs.

35. The vehicle of claim 31 wherein at least one of the linkage assemblies is a four-bar linkage assembly.

36. An automotive vehicle convertible roof system comprising:

a substantially rigid front roof section;

a substantially rigid rear roof section coupled to the front roof section;

at least one substantially stationary bracket having at least two spaced apart pivot axes;

a first linkage assembly coupled to the rear roof section, the first linkage assembly including a first link coupling a first of the pivot axes to the rear roof section and a second link coupling a second of the pivot axes to the rear roof section;

an automatically powered actuator attached to the second link at a point substantially between the second pivot axis and the rear roof section;

the rear roof section being retractable to a substantially vertical position; and a substantially rigid tonneau cover movable from a closed position to an open position, the tonneau cover having an external middle surface which is substantially horizontal when in its closed position, the tonneau cover operably covering at least a portion of at least one of the roof sections when the roof sections are retracted.

37. The system of claim 36 further comprising a second linkage assembly coupling the front roof section to the rear roof section, the second linkage assembly including at least two substantially parallel links having ends pivotally attached to a member moving with and positioned adjacent a lower portion of the rear roof section.

38. The system of claim 36 wherein the second linkage assembly includes a bellcrank.

39. The system of claim 36 further comprising:

a rigid back window attached to the rear roof section; and a tonneau linkage assembly operably moving the tonneau cover, the tonneau linkage assembly including a scissor linkage portion and a gooseneck linkage portion.

40. The system of claim 36 further comprising:

a second linkage assembly coupling the front roof section to the rear roof section;

for each side of the vehicle, the first and second linkage assemblies serving to exclusively cause automated movement of the front and rear roof sections without direct connection between the front roof section and the bracket.

41. The system of claim 36 wherein the front roof section is retractable to a substantially vertical position substantially simultaneous with retraction of the rear roof section.

42. The system of claim 36 further comprising:

a supplemental actuator having a housing entirely movable with at least a portion of the first linkage assembly; and a camming mechanism coupling at least a portion of the rear roof section to the first linkage assembly, the supplemental actuator and the camming mechanism operably causing the rear roof section to move relative to the front roof section.

* * * * *

UNITED STATES PATENT AND TRADEMARK OFFICE
CERTIFICATE OF CORRECTION

PATENT NO. : 6,659,534 B2
DATED : December 9, 2003
INVENTOR(S) : Michael T. Willard It is certified that error appears in the above-identified patent and that said Letters Patent is hereby corrected as shown below:

Title page,
Item [56], References Cited, OTHER PUBLICATIONS,
"Ford Mustang Retractable Hardtop/1966" reference, after "published" insert -- prior --.
"Lada" reference, "Roadste/2000" should be -- Roadster/2000 --.

Column 1,
Line 17, "forward most" should be -- forwardmost --.

Column 6,
Line 56, after "and" insert -- the roofs to --.

Column 8,
Line 42, "ace" should be -- space --.

Column 9,
Line 14, "defines a hard-top roof section" should be -- are hard-top roof sections --.
Line 54, "substantial" should be -- substantially --.

Column 10,
Line 61, "36" should be -- 37 --.

Signed and Sealed this

First Day of February, 2005

JON W. DUDAS
*Director of the United States Patent and Trademark Office*